United States Patent
Ichieda

(10) Patent No.: US 10,025,400 B2
(45) Date of Patent: Jul. 17, 2018

(54) DISPLAY DEVICE AND DISPLAY CONTROL METHOD

(71) Applicant: SEIKO EPSON CORPORATION, Tokyo (JP)

(72) Inventor: Hiroyuki Ichieda, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/423,952

(22) Filed: Feb. 3, 2017

(65) Prior Publication Data

US 2017/0147090 A1    May 25, 2017

Related U.S. Application Data

(63) Continuation of application No. 13/721,554, filed on Dec. 20, 2012, now Pat. No. 9,600,091.

(30) Foreign Application Priority Data

Jan. 5, 2012   (JP) ................................ 2012-000506
Mar. 19, 2012  (JP) ................................ 2012-062011

(51) Int. Cl.
  *G06F 3/038*   (2013.01)
  *H04N 9/31*    (2006.01)

(52) U.S. Cl.
  CPC ............ *G06F 3/038* (2013.01); *H04N 9/312* (2013.01)

(58) Field of Classification Search
  CPC ........... G09G 5/08; G06F 3/033; G06F 3/038; H04N 9/312
  See application file for complete search history.

(56) References Cited

U.S. PATENT DOCUMENTS

| | | |
|---|---|---|
| 6,222,593 B1 | 4/2001 | Higurashi et al. |
| 6,358,706 B1 | 3/2002 | Dubin et al. |
| 6,512,507 B1 | 1/2003 | Furihata et al. |
| 6,618,076 B1 | 9/2003 | Sukthankar et al. |
| 8,149,215 B2 | 4/2012 | Leung et al. |
| 8,436,813 B2 | 5/2013 | Yoo et al. |

(Continued)

FOREIGN PATENT DOCUMENTS

| | | |
|---|---|---|
| CN | 1510913 A | 7/2004 |
| JP | H09-326981 A | 12/1997 |

(Continued)

OTHER PUBLICATIONS

Sep. 2, 2016 Office Action Issued in U.S. Appl. No. 13/721,554.

(Continued)

*Primary Examiner* — Jennifer Mehmood
*Assistant Examiner* — Sardis F Azongha
(74) *Attorney, Agent, or Firm* — Oliff PLC

(57) ABSTRACT

A projector displays an image supplied by a PC on a screen using a projection unit, detects a pointed location on the screen using a location detection unit, calculates first coordinates as coordinates of the pointed location in a displayable area of the screen using a coordinate calculation part, converts the calculated first coordinates into second coordinates as coordinates in the supply image using a coordinate conversion part based on image location information indicating a location of the supply image on the screen, outputs the second coordinates obtained by the conversion from an output unit, and corrects the image location information by processing of displaying the image based on a correction image using a control unit.

5 Claims, 11 Drawing Sheets

(56) References Cited

U.S. PATENT DOCUMENTS

| | | |
|---|---|---|
| 8,988,397 B2 | 3/2015 | Naka |
| 2001/0055060 A1 | 12/2001 | Kitazawa |
| 2002/0089489 A1* | 7/2002 | Carpenter .............. G06F 3/0386 345/158 |
| 2003/0210381 A1 | 11/2003 | Itaki |
| 2004/0156024 A1 | 8/2004 | Matsuda et al. |
| 2006/0007177 A1 | 1/2006 | McLintock |
| 2006/0197756 A1 | 9/2006 | Sun |
| 2007/0216644 A1 | 9/2007 | Nam et al. |
| 2009/0251486 A1 | 10/2009 | Sakakibara et al. |
| 2010/0315825 A1 | 12/2010 | Kawamura |
| 2011/0025650 A1* | 2/2011 | Joscelyne ............. G06F 3/0418 345/178 |
| 2011/0032215 A1 | 2/2011 | Sirotich et al. |
| 2011/0119638 A1 | 5/2011 | Forutanpour |
| 2011/0292218 A1 | 12/2011 | Ichieda |
| 2013/0082923 A1* | 4/2013 | Lin ....................... G06F 3/0308 345/157 |

FOREIGN PATENT DOCUMENTS

| | | |
|---|---|---|
| JP | 2005-092592 A | 4/2005 |
| JP | 2008-003802 A | 1/2008 |
| JP | 2008-065511 A | 3/2008 |
| JP | 2009-080333 A | 4/2009 |
| JP | 4272904 B2 | 6/2009 |
| JP | 2011-013396 A | 1/2011 |

OTHER PUBLICATIONS

Nov. 30, 2016 Notice of Allowance issued in U.S. Appl. No. 13/721,554.
Feb. 10, 2016 Office Action issued in U.S. Appl. No. 13/721,554.
Aug. 26, 2015 Office Action issued in U.S. Appl. No. 13/721,554.
Apr. 23, 2015 Office Action issued in U.S. Appl. No. 13/721,554.
Dec. 16, 2014 Office Action issued in U.S. Appl. No. 13/721,554.
Jun. 24, 2014 Office Action issued in U.S. Appl. No. 13/721,554.

* cited by examiner

RESOLUTION TABLE

| SCREEN MODE | REFRESH RATE (Hz) | RESOLUTION |
|---|---|---|
| VGA | 60/72/75/85 | 640 x 480 |
| SVGA | 56/60/72/75/85 | 800 x 600 |
| XGA | 60/70/75/85 | 1024 x 768 |
| WXGA | 60 | 1280 x 768 |
| | 60 | 1360 x 768 |
| | 60/75/85 | 1280 x 800 |
| WXGA+ | 60/75/85 | 1440 x 900 |
| SXGA | 70/75/85 | 1152 x 864 |
| | 60/75/85 | 1280 x 1024 |
| | 60/75/85 | 1280 x 960 |
| SXGA+ | 60/75/85 | 1400 x 1050 |

FIG. 7

DISPLAY DEVICE AND DISPLAY CONTROL METHOD

This is a Continuation of application Ser. No. 13/721,554, filed Dec. 20, 2012, which claims priority to Japanese Patent Application No. 2012-000506, filed Jan. 5, 2012, and Japanese Patent Application. No. 2012-062011, filed Mar. 19, 2012. The disclosures of the prior applications are hereby incorporated by reference herein in their entirety.

BACKGROUND

1. Technical Field

The present invention relates to a display device that output information of a pointed location in response to an operation of pointing a location, and a display control method.

2. Related Art

In related art, when a specific location of an image displayed by a display device such as a projector is pointed, a device of detecting the pointed location and displaying a pointer or the like in response to the detected location has been known (for example, see Patent Document 1 (Japanese Patent No. 4272904)). In this type of device, it is necessary to perform calibration so that the pointed location and the display location of the pointer or the like may coincide with each other. Generally, it is necessary to recalibrate at each time when the display condition changes in such a way that the display location of the displayed image changes, and lots of effort is required. Accordingly, in the device disclosed in Patent Document 1, when the display location changes, location change data indicating a location relationship between before and after the change is used, and thereby, the calibration is omitted.

The display device that detects and outputs the pointed location in the above described manner requires information on resolution of the displayed image. For example, the device disclosed in Patent Document 1 requires data indicating a relationship between before and after change when the display condition is changed, and determines resolution of the image by measuring the frequency of input horizontal and vertical synchronizing signals.

However, for example, information on correct resolution with respect to the input signals may not be obtained in the case where an image with unknown resolution is input or information on resolution is erroneously determined. Recently, the number of types of screen resolution has been ever increasing due to the widespread of digital broadcasting, the higher image quality of video contents, the diversification of display devices including portable equipment, or the like, and there are not a few cases where images with resolution not supported by the display devices is input. In the case, it is impossible to obtain information on resolution using a display device in related art, and there has been a problem that it is impossible to accurately obtain the location relationship between the pointed location and the image being displayed.

SUMMARY

An advantage of some aspects of the invention is to provide a display device that includes a function of specifying a pointed location with respect to an image being displayed and can support an image with unknown resolution, and a display control method.

An aspect of the invention is directed to a display device including a display unit that displays a supply image supplied from an image source on a display surface, a pointed location detection unit that detects a pointed location on the display surface, a coordinate calculation unit that calculates first coordinates as coordinates of the pointed location in a displayable area on the display surface, a coordinate conversion unit that converts the first coordinates calculated by the coordinate calculation unit into second coordinates as coordinates in the supply image based on image location information indicating a location of the supply image on the display surface, an output unit that outputs the second coordinates obtained by the coordinate conversion unit, and a location correction unit that corrects the image location information by processing of a displayed correction image.

According to the aspect of the invention, the pointed location may be detected in response to the pointing operation with respect to the display surface on which the image is displayed, and the coordinates of the detected pointed location may be converted into the coordinates in the supply image and output. Then, the image location information indicating the location of the supply image on the display surface may be corrected using the image for correction, and thus, even when accurate information on the resolution can not be obtained such that the supply image with unknown resolution is displayed or information on the resolution is erroneously determined, the coordinates may be accurately converted and output. Thereby, the coordinates of the location pointed by the operation with respect to the display surface on which the image is displayed may be accurately output regardless of the resolution of the supplied image.

Another aspect of the invention is directed to the display device described above, wherein the coordinate conversion unit converts the first coordinates calculated by the coordinate calculation unit into the second coordinates based on resolution of the supply image and the image location information.

According to this aspect of the invention, the pointed location with respect to the display surface may be detected and the detected pointed location may be accurately converted into the coordinates in the supply image and output.

Still another aspect of the invention is directed to the display device described above, wherein the image for correction displayed by the display unit includes a marker placed in a location with a high possibility to be displayed within the displayable area.

According to this aspect of the invention, the image location information may be accurately and promptly corrected using the marker located in the displayable area and the accurate coordinates may be output.

Yet another aspect of the invention is directed to the display device described above, wherein the location correction unit corrects the image location information based on the pointed location detected by the pointed location detection unit and a location of the marker in the image for correction under a condition that the display unit displays the image for correction on the display surface.

According to this aspect of the invention, the image for correction may be displayed, and the image location information may be accurately corrected based on the location pointed by the operation with respect to the display surface and the location of the marker and the accurate coordinates may be output.

Still yet another aspect of the invention is directed to the display device described above, wherein the location correction unit detects the marker in the image for correction displayed on the display surface by the display unit, and corrects the image location information based on a detected location of the marker that has been actually detected.

According to this aspect of the invention, by detecting the marker, the image location information may be corrected independently of the pointing operation and the accurate coordinates may be output.

Further another aspect of the invention is directed to the display device described above, wherein the display unit includes an image development unit that develops the image displayed on the display surface based on the supply image in a memory corresponding to the displayable area, and is adapted to display the image developed in the memory on the display surface, and the location correction unit detects a location of the marker in the image developed in the memory and corrects the image location information based on the detected location.

According to this aspect of the invention, by detecting the marker of the image developed in the memory, the image location information may be corrected independently of the pointing operation and the accurate coordinates may be output. Further, by detecting the marker from the image of the memory, the location of the marker may be promptly and accurately specified.

Still further another aspect of the invention is directed to the display device described above, which further includes a display control unit that allows the display unit to display the image for correction, and a display location detection unit that detects a display location in which the image for correction is displayed by control of the display control unit, wherein the location correction unit corrects the display location of the image displayed by the display unit based on the display location detected by the display location detection unit.

According to this aspect of the invention, even when the display location of the image is shifted for the reason that the resolution of the displayed image can not be accurately acquired or the like, the display location may be corrected and the image may be displayed in the proper location.

Yet further another aspect of the invention is directed to the display device described above, which further includes a resolution determination unit that determines resolution of the supply image, wherein the display control unit allows the display unit to display the image for correction in a display location in response to the resolution determined by the resolution determination unit, and the location correction unit corrects information on the resolution determined by the resolution determination unit based on the display location detected by the display location detection unit.

According to this aspect of the invention, in the case where the image is displayed in the display location in response to the resolution of the supply image, even when the display location is shifted because accurate information on the resolution of the image can not be acquired, the display location of the image may be corrected by correcting the information on the resolution, and the image may be displayed in the accurate location.

Still yet further another aspect of the invention is directed to the display device described above, wherein the display control unit allows the display unit to display the supply image supplied from an external device as the image source, and switches the image for correction inside to the supply image when the correction of the display location is started.

According to this aspect of the invention, by switching the image supplied from the external device to the image for correction, the display location may be promptly corrected.

A further aspect of the invention is directed to the display device which further includes a pointed location detection unit that detects a pointed location with respect to the display surface, wherein the display location detection unit detects the display location in which the image for correction is displayed based on the pointed location detected by the pointed location detection unit under a condition that the image for correction is displayed.

According to this aspect of the invention, the display location of the image may be accurately detected based on the location pointed by the operation with respect to the display surface, and the processing related to the correction of the display location may be accurately performed.

A still further aspect of the invention is directed to the display device described above, wherein the image for correction includes an image for guiding a location pointing operation.

According to this aspect of the invention, by promoting the location pointing operation for detecting the display location using the image for correction, the processing related to the correction of the display location may be promptly performed.

A yet further aspect of the invention is directed to the display device described above, wherein the image for correction includes a marker placed in a location with a high possibility to be displayed within the displayable area, the display unit includes an image development unit that develops the image displayed on the display surface based on the supply image in a memory corresponding to the displayable area, and is adapted to display the image developed in the memory on the display surface, and the display location detection unit detects the display location of the image for correction based on a location of the marker in the image developed in the memory.

According to this aspect of the invention, by detecting the marker of the image developed in the memory, the display location of the image may be accurately detected independently of the operation from the outside or the like.

A still yet further aspect of the invention is directed to the display device described above, wherein the display unit is a projector including a light modulation unit that modulates light emitted from a light source, an image formation unit that forms the display image on the light modulation unit based on the supply image, and a projection unit that projects the display image formed by the image formation unit on a projection surface as the display surface.

According to this aspect of the invention, in the projector projecting the image, the location pointed by the pointing operation with respect to the projection surface may be accurately converted into coordinates in the supply image and output.

A furthermore aspect of the invention is directed to a display control method including displaying a supply image supplied by an image source on a display surface, detecting a pointed location on the display surface, calculating first coordinates as coordinates of the pointed location in a displaceable area on the display surface, converting the calculated first coordinates into second coordinates as coordinates in the supply image based on image location information indicating a location of the supply image on the display surface, outputting the second coordinates obtained by the conversion, and correcting the image location information by processing of a displayed correction image.

According to this aspect of the invention, the pointed location may be detected in response to the pointing operation with respect to the display surface on which the image is displayed, and the coordinates of the detected pointed location may be converted to the coordinates in the supply image and output. Then, the image location information indicating the location of the supply image on the display surface may be corrected using the image for correction, and thus, even when accurate information on the resolution can not be obtained such that the supply image with unknown resolution is displayed or information on the resolution is erroneously determined, the coordinates may be accurately converted and output. Thereby, the coordinates of the location pointed by the operation with respect to the display surface on which the image is displayed may be accurately output regardless of the resolution of the supplied image.

The invention can be implemented as a program that can be executed by a computer that controls a display device displaying an image on a display surface. The program allows the computer to function as a display unit that displays a supply image supplied from an image source on a display surface, a pointed location detection unit that detects a pointed location on the display surface, a coordinate calculation unit that calculates first coordinates as coordinates of the pointed location in a displayable area on the display surface, a coordinate conversion unit that converts the first coordinates calculated by the coordinate calculation unit into second coordinates as coordinates in the supply image based on image location information indicating a location of the supply image on the display surface, an output unit that outputs the second coordinates obtained by the coordinate conversion unit, and a location correction unit that corrects the image location information by processing of a displayed correction image.

Further, the invention can be implemented as a recording medium in which the program is recorded in a computer-readable form.

According to the aspects of the invention, using the display device displaying the supplied image, the coordinates of the location pointed by the operation with respect to the display surface on which the image is displayed may be accurately output regardless of the resolution of the supplied image.

BRIEF DESCRIPTION OF THE DRAWINGS

The invention will be described with reference to the accompanying drawings, wherein like numbers reference like elements.

FIG. 4A shows a state in which a pointer is projected according to a pointed location and FIG. 4B shows an example in which drawing is performed according to the pointed location.

FIG. 7 schematically shows a configuration example of a resolution table of defining resolution supported by the projector.

FIG. 8A shows an example of projection in a proper screen mode and 8B shows an example of projection in an improper screen mode.

FIG. 9A shows an example including a rectangle as a marker and FIG. 9B shows an example using a pointer as a marker.

FIG. 10A shows a state before correction and FIG. 10B shows a state after correction.

DESCRIPTION OF EXEMPLARY EMBODIMENTS

As below, embodiments to which the invention is applied will be explained with reference to the drawings.

Figure 1:
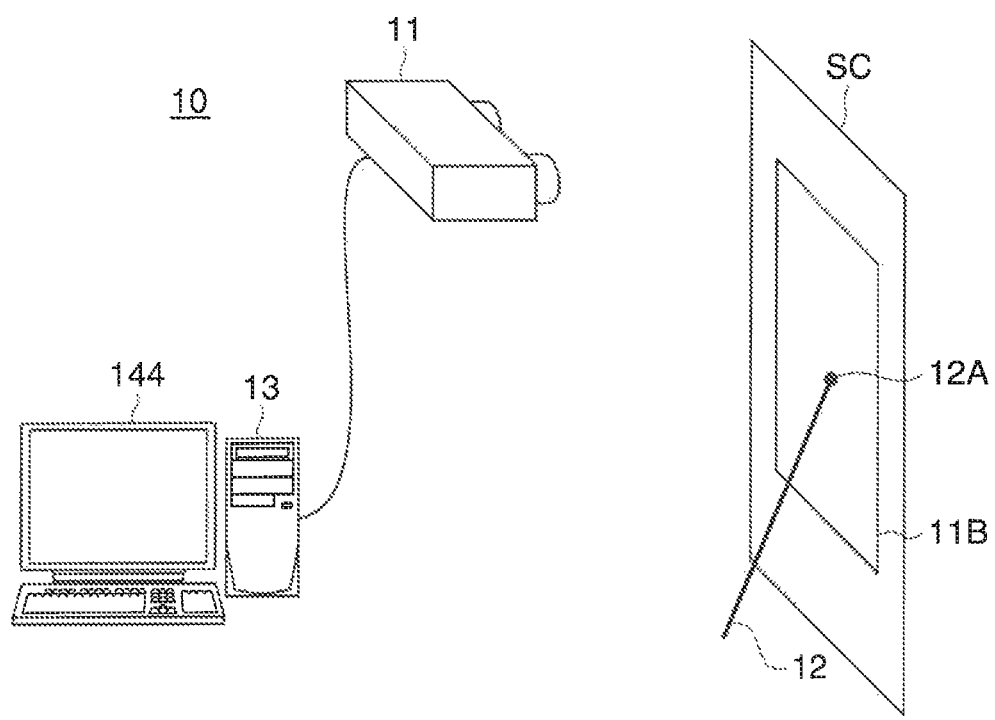
FIG. 1 shows a configuration of a display system according to an embodiment of the invention.

FIG. 1 shows a configuration of a display system 10 using a projector 11 according to an embodiment.

The projector 11 as a display device is wired-connected to a PC (Personal Computer) 13 as an image supply device by an image signal cable or the like. For example, an analog image signal (analog RGB component video signal or the like) is input from the PC 13 to the projector 11 via a VGA terminal, and the projector 11 projects a display image on a screen SC as a projection surface (display surface) based on the input image signal. Further, the projector 11 is connected to the PC 13 by a communication cable or the like and transmits and receives control data etc. between the PC 13 and itself. The projector 11 may perform projection if the image input from the PC 13 is a still image or a moving image. The screen SC is not limited to a flat plate fixed to a wall surface, but the wall surface itself may be used as the screen SC. Here, a range in which images are projected on the projector 11 is referred to as an effective projection area 11B (displayable area).

In the display system 10, during image projection by the projector 11, a user may hold a pointing tool 12 in his or her hand and execute an operation of pointing an arbitrary location (location pointing operation) in the effective projection area 11B of the screen SC. The pointing tool 12 is an operation device having a pen shape or a rod shape, and used for pointing an arbitrary location on the screen SC. The projector 11 has a function of detecting a tip end location of the pointing tool 12, as will be described later, and outputs control data indicating coordinates of the detected pointed location to the PC 13.

Figure 2:
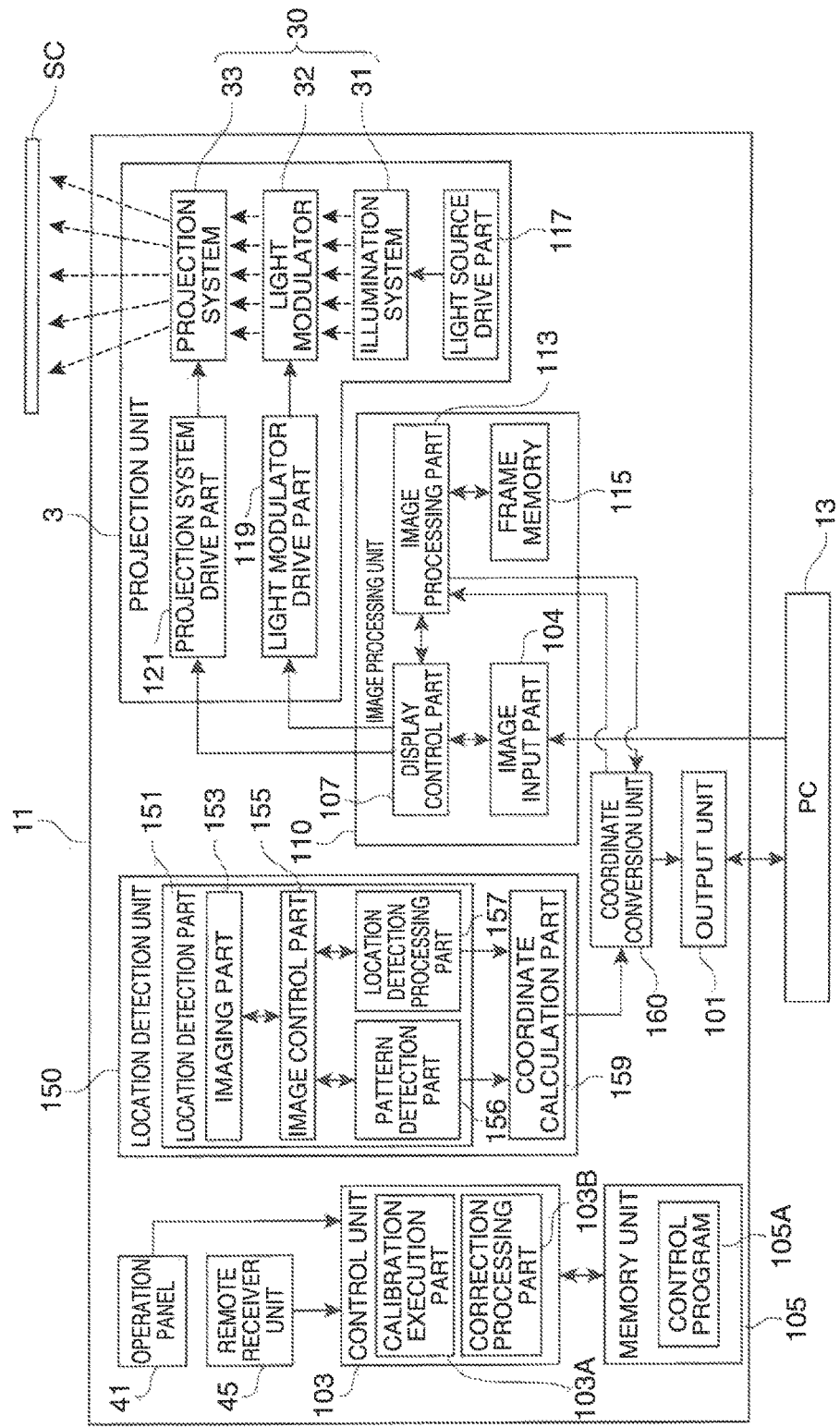
FIG. 2 is a block diagram showing a functional configuration of a projector.

FIG. 2 is a block diagram showing a functional configuration of the projector 11.

The projector 11 is roughly divided and includes an image processing unit 110 that executes image processing for display based on the image input from the PC 13, a projection unit 3 (display unit) that projects an image on the screen SC according to the control of the image processing unit 110, a location detection unit 150 that detects a pointed location of the pointing tool 12 on the screen SC, a coordinate conversion unit 160 that converts coordinates of the pointed location detected by the location detection unit 150 into coordinates in the image data, an output unit 101 (output unit) that outputs the converted coordinates converted by the coordinate conversion unit 160 to the PC 13, and a control unit 103 that controls the respective units.

The control unit 103 includes a CPU, a nonvolatile memory, a RAM, etc (not shown), and reads out a control program 105A stored in a memory unit 105 connected to the control unit 103 and controls the respective units of the projector 11. Further, by executing the control program 105A stored in the memory unit 105, the control unit 103 functions as a calibration execution part 103A.

The calibration execution part 103A executes calibration, which will be described later, and obtains a parameter indicating a correspondence relationship (coordinate conversion parameter) between the coordinates in taken image data and the coordinates in the area on the screen SC to be calibrated (for example, the effective projection area 11B). The memory unit 105 includes a magnetic, optical recording device or a semiconductor memory device, and stores data of various programs, various set values, etc. including the control program 105A.

An operation panel 41 and a remote receiver unit 45 are connected to the control unit 103.

The operation panel 41 includes various switches and indicator lamps and is provided on an exterior housing (not shown) of the projector 11. The control unit 103 appropriately lights or blinks the indicator lamps of the operation panel 41 in response to the operation condition and the set condition of the projector 11. When the switch of the operation panel 41 is operated, an operation signal in response to the operated switch is output to the control unit 103.

Further, the projector 11 receives an infrared signal transmitted from a remote (not shown) used by the user as an operator who operates the projector 11 in response to a button operation by the remote receiver unit 45. The remote receiver unit 45 receives the infrared signal received from the remote using a light receiving element, and outputs operation signal in response to the signal to the control unit 103. The operation panel 41, the remote, etc. form an operation part for the user to input the operation for the projector 11. The operation signal indicating the operation for the projector 11 may be transmitted from the PC 13 to the projector 11 and the projector 11 may be controlled based on the operation signal. In this case, the PC 13 also function as the operation part for the user to input the operation for the projector 11.

The control unit 103 detects the operation by the user based on the operation signal input from the operation panel 41 or the remote receiver unit 45, and controls the projector 11 according to the operation.

The projector 11 is roughly divided and includes an optical system that forms an optical image and an image processing system that electrically processes an image signal. The optical system is a projection unit 30 (projection unit) including an illumination system 31, a light modulator 32 (light modulation unit), and a projection system 33. The illumination system 31 includes a light source of a xenon lamp, ultrahigh pressure mercury lamp, an LED (Light Emitting Diode), laser, or the like. Further, the illumination system 31 may include a reflector and an auxiliary reflector that guide light generated by the light source to the light modulator 32, and may include a group of lenses (not shown) for improving the optical property of the projection light, a polarizer, a photochromic element that reduces the amount of light generated by the light source in a path reaching the light modulator 32, or the like.

The light modulator 32 includes a modulation area that modulates incident light, receives the signal from a image processing system (image processing unit 110), which will be described later, and modulates the light from the illumination system 31. In the embodiment, the case where the light modulator 32 is formed using a transmissive liquid crystal panel will be explained as an example. In this configuration, the light modulator 32 includes three liquid crystal panels corresponding to the three primary colors of RGB for color projection. The light from the illumination system 31 is separated into three color lights of RGB and the respective color lights enter the corresponding respective liquid crystal panels. The color lights modulated through the respective liquid crystal panels are combined by a combining system including a cross dichroic prism or the like and output to the projection system 33.

The projection system 33 includes a zoom lens that enlarges, reduces, and focuses the projected image, a zoom adjustment motor that adjusts the degree of zooming, a focus adjustment motor that performs adjustment of focus, etc.

The projection unit 3 includes a projection system drive part 121 that drives the respective motors of the projection system 33 according to the control of a display control part 107, a light modulator drive part 119 that drives the light modulator 32 to modulate the incident light based on the image signal output from the display control part 107, and a light source drive part 117 that drives the light source of the illumination system 31 according to the control of the control unit 103 in addition to the projection unit 30.

On the other hand, the image processing system includes an image processing unit 110 that processes image data according to the control of the control unit 103 that controls the entire projector 11 in an integrated manner. The image processing system 110 includes an image input part 104 connected to the PC 13. The image input part 104 is an interface to which image data is input and, for example, general-purpose interfaces such as a DVI (Digital Visual Interface) interface, a USB interface, and a LAN interface to which digital video signals are input, an S-video terminal to which composite video signals such as NTSC, PAL, SECAM are input, an RCA terminal to which composite video signals are input, a D-terminal and a VGA terminal to which component video signals are input, an HDMI connector compliant to the HDMI (registered trademark) standard, etc. may be used. Note that the image input part 104 may transmit and receive image signals via wired communication or transmit and receive image signals via wireless communication. Further, the image input part 104 may have a DisplayPort designed by VESA (Video Electronics Standards Association), and specifically have a DisplayPort connector or a Mini Displayport connector and an interface circuit compliant to the Displayport standard. In this case, the projector 11 may be connected to the DisplayPort of the PC 13 or a portable device having the same function as that of the PC 13.

In the embodiment, the configuration in which an analog image signal is input from the PC 13 to the VGA terminal of the image input part 104 will be explained. The image input part 104 has an A/D converter circuit that converts the analog image signal input from the PC 13 into digital image data, and outputs the converted digital image data to the display control part 107.

Furthermore, the image processing unit 110 includes the display control part 107 that processes the image input to the image input part 104, and an image processing part 113 that develops an image in a frame memory 115 according to the control of the display control part 107 and generates an image to be projected by the projection unit 30.

The display control part 107 determines the refresh rate, the horizontal resolution, and the vertical resolution of the analog image signal input from the PC 13 to the image input part 104, and determines one of plural screen modes preset as the screen modes that the projector 11 can display as the screen mode in response to the input signal. The display control part 107 determines necessary processing for display according to the screen mode determined by the image input part 104, and executes the processing by controlling the image processing part 113. The image processing part 113 develops the image data input via the image input part 104 in the frame memory 115 according to the control of the display control part 107, appropriately executes various conversion processing such as interlace/progressive conversion and resolution conversion, generates an image signal in a predetermined format for displaying the display image drawn in the frame memory 115, and outputs the signal to the display control part 107. Note that the projector 11 may change the resolution and the aspect ratio of the input image data and display the data, or display the image data dot by dot with the resolution and the aspect ratio of the input image data maintained. Further, the image processing part 113 may execute various image processing such as keystone correction, color compensation in response to the color mode, and enlarging/reducing processing according to the control of the display control part 107. The display control part 107 outputs the image signal processed by the image processing part 113 to the light modulator drive part 119, and displays the signal on the light modulator 32. Further, the image processing part 113 derives image location information (image location data) from information of the resolution, the aspect ratio of the image data being displayed, the display size in the liquid crystal display panel of the light modulator 32, etc., and outputs the obtained image location information to the coordinate conversion unit 160. The image location information is information indicating a location within the effective projection area 11B where the display image is projected (displayed). In other words, the image location information is information on placement of the display image in the effective projection area 11B and indicates the location (placement) of the display image in the effective projection area 11B. The image location information changes when the display resolution of the PC 13 changes and the resolution of the image data output by the PC 13 to the projector 11 changes (for example, when setting with respect to the resolution is changed in the PC 13) or the like. Note that the image location information may be regarded as information on the placement of the image in the modulation area of the light modulator 32.

The control unit 103 executes the control program 105A and controls the display control part 107 to execute the keystone correction of the display image formed on the screen SC. Further, the control unit 103 controls the display control part 107 to execute the enlarging/reducing processing of the display image based on the operation signal input from the operation panel 41 or the remote receiver unit 45.

The projector 11 has the location detection unit 150 (pointed location detection unit) that detects coordinates of the pointed location pointed by the pointing tool 12 on the screen SC. The location detection unit 150 includes a location detection part 151 having an imaging part 153 that images the screen SC, an image control part 155 that controls the imaging part 153, and a location detection processing part 157 that detects the pointed location of the pointing tool 12 based on the taken image of the imaging part 153, and a coordinate calculation part 159 (coordinate calculation unit) that calculates the coordinates of the pointed location detected by the location detection part 151.

The imaging part 153 is a digital camera of taking an angle of view including the maximum range in which the projection unit 30 can project images on the screen SC (corresponding to a maximum projection area 11A, which will be described later), and executes imaging according to the control of the image control part 155 and outputs taken image data. In other words, the imaging part 153 is set so that it can image a range including the entire maximum projection area 11A. The image control part 155 controls the imaging part 153 to execute imaging according to the control of the control unit 103. When the imaging part 153 has mechanisms of adjusting zoom factor, focus, aperture at imaging, the image control part 155 controls these mechanisms to execute imaging under preset conditions. After imaging, the image control part 155 acquires the taken image data output by the imaging part 153 and outputs the data to the location detection processing part 157. The taken image data output from the imaging part 153 may be expressed in the format of RGB, YUV, or the like, or may indicate only the brightness component. Further, the image control part 155 may output the taken image data output from the imaging part 153 to the location detection processing part 157 without change, or adjust resolution or convert the data into a predetermined file format (JPEG, BMP, or the like) and output the data to the location detection processing part 157.

Note that the imaging part 153 may have a configuration that can image visible light or a configuration that can image non-visible light (infrared light or the like). In the case where the imaging part 153 can image non-visible light, a configuration in which the pointing tool 12 outputs non-visible light and the imaging part 153 images the non-visible light output from the pointing tool 12 or a configuration in which the pointing tool 12 has a reflection part that can reflect non-visible light, non-visible light is projected from the projector 11 to the screen SC under the control of the control unit 103, and the non-visible light reflected by the reflection part of the pointing tool 12 is imaged by the imaging part 153, or the like may be employed.

The location detection processing part 157 analyzes the taken image data input from the image control part 155, and extracts a boundary between the outside of the effective projection area 11B and the effective projection area 11B and the image of the pointing tool 12 from the taken image data and specifies the pointed location by the pointing tool 12. The pointed location of the pointing tool 12 is a location of the tip end of the rod-shaped or pen-shaped pointing tool 12, for example.

The coordinate calculation part 159 calculates the coordinates based on the pointed location of the pointing tool 12 detected by the location detection processing part 157 and the coordinate conversion parameter obtained by the calibration execution part 103A. Specifically, the coordinate calculation part 159 obtains the coordinates of the pointed location detected by the location detection processing part 157 in the effective projection area 11B, and outputs coordinate data (coordinate information) representing the calculated coordinates to the coordinate conversion unit 160. In the following explanation, the coordinate data calculated by the coordinate calculation part 159 and output from the location detection unit 150 is also referred to as "first coordinate data". Further, in the following explanation, the coordinate data may be simply referred to as "coordinates". In the embodiment, the first coordinate data represents the coordinates normalized within the area to be calibrated on the screen SC. For example, if the entire effective projection area 11B is to be calibrated, with the origin (0,0) on the upper left vertex of effective projection area 11B, the upper right vertex, the lower left vertex, and the lower right vertex of the effective projection area 11B may be expressed by (1,0), (0,1), (1,1), respectively. In this case, the coordinates of the center of the effective projection area 11B are expressed by (0.5,0.5).

The coordinate conversion unit 160 (coordinate conversion unit) converts the first coordinate data (first coordinate information) output by the location detection unit 150 into second coordinate data (second coordinate information) representing the coordinates in the image data input by the PC 13 to the projector 11. Specifically, the coordinate conversion unit 160 converts the first coordinate data representing the coordinates on the screen SC into the second coordinate data representing the coordinates in the input image data based on the image location information output by the image processing part 113. The second coordinate data represents the coordinates normalized in the image data. For example, with the origin (0,0) on the upper left vertex of the image data, the upper right vertex, the lower left vertex, and the lower right vertex of the image data are expressed by (1,0), (0,1), (1,1), respectively. In this case, the coordinates of the center of the image data are expressed by (0.5,0.5).

The first coordinate data output by the location detection unit 150 represents the coordinates detected based on the taken image data of the imaging part 153, and the coordinates may be expressed by the coordinates on the coordinate axes vertically provided on the screen SC. However, the correspondence relationship between the coordinates on the screen SC and the coordinates on the taken image data is affected by various elements such as the distance between the projector 11 and the screen SC, the zoom factor in the projection system 33, the installation angle of the projector 11, and the distance between an imaging device 5 and the screen SC, etc. Therefore, the coordinates on the taken image data corresponding to a certain location on the screen SC change in response to these elements. Accordingly, in the projector 11 according to the embodiment of the invention, first, the calibration execution part 103A executes calibration, and obtains the coordinate conversion parameter indicating the correspondence relationship between the coordinates in the taken image data and the coordinates in the area on the screen SC to be calibrated. When the coordinate conversion parameter is obtained by the calibration execution part 103A, the coordinate calculation part 159 performs conversion of the coordinates and obtains the first coordinate data based on the coordinate conversion parameter. Further, the coordinate conversion unit 160 converts the first coordinate data output from the coordinate calculation part 159 based on the image location information, and outputs the converted coordinate data (second coordinate data) to the output unit 101.

The output unit 101 is an interface connected to the PC 13 and outputting the coordinate data after conversion processing by the coordinate conversion unit 160 to the PC 13, and, for example, includes a general-purpose interface such as a USE interface, a wired LAN interface, a wireless LAN interface, or IEEE 1394. Here, the image input part 104 and the output unit 101 will be explained as separate functional blocks, however, obviously, they may be physically integrated into one interface. For example, one USB interface may realize both functions of the output unit 101 and the image input part 104. Further, the output unit 101 may be connected to the image processing part 113 of the image processing unit 110 and may output the coordinates after the conversion processing of the coordinate conversion unit 160 to the image processing unit 110. The output destination of the output unit 101 is controlled by the control unit 103. The coordinate data output by the output unit 101 is output to the PC 13 as the same data as coordinate data output by a pointing device such as a mouse, a trackball, a digitizer, a pen tablet, or the like.

Further, in the PC 13, in the case where the coordinate data output from the output unit 101 is treated equally to the coordinate data output by the general-purpose pointing devices, general-purpose device driver programs corresponding to these general-purpose pointing devices may be used. Generally, these general-purpose device driver programs are installed as part of the OS (operating system) of the PC 13 in advance, and thus, it is not necessary to device driver programs when the general-purpose device driver programs are used. Further, it is not necessary to prepare specialized device driver programs because the general-purpose device driver programs are used. On the other hand, the information that can be exchanged between the projector 11 and the PC 13 is limited in the range defined by the specifications of the general-purpose device driver programs.

Alternatively, specialized device driver programs compliant to the projector 11 may be prepared and the device driver programs may be installed and used in the PC 13. In this case, the specialized device driver programs are necessary, but the information that can be exchanged between the projector 11 and the PC 13 may be arbitrarily set in response to the specifications of the specialized device driver programs.

Figure 3:
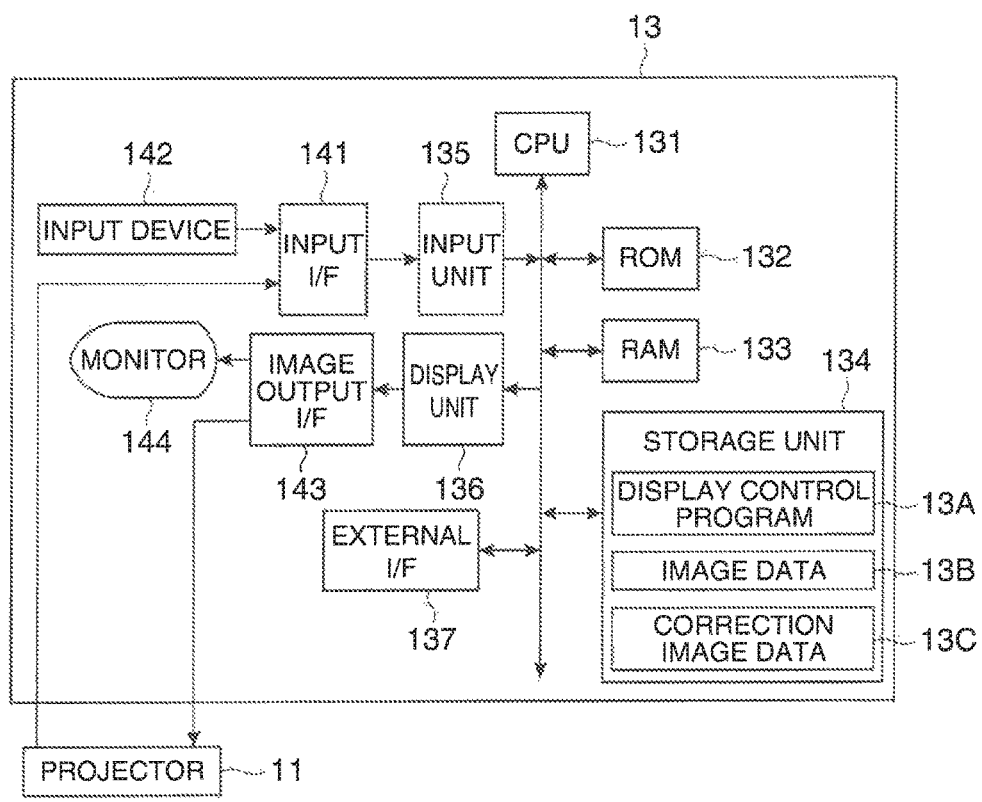
FIG. 3 is a block diagram showing a functional configuration of a PC.

FIG. 3 is a block diagram showing a functional configuration of the PC 13.

As shown in FIG. 3, the PC 13 includes a CPU 131 that executes the control programs and centrally controls the respective parts of the PC 13, a ROM 132 that stores a basic control program to be executed by the CPU 131 and data on the program, a RAM 133 that temporarily stores the programs and the data executed by the CPU 131, a storage unit 134 that stores the programs and the data in a non-volatile manner, an input unit 135 that detects an input operation and outputs data and an operation signal indicating input contents to the CPU 131, a display unit 136 that outputs display data for displaying processing results by the CPU 131 etc., and an external I/F 137 that transmits and receives data etc. between an external device and itself, and these respective units are connected to one another via a bus.

The input unit 135 includes an input I/F 141 having a connector and a power supply circuit, and an input device 142 is connected to the input I/F 141. The input I/F 141 includes a general-purpose interface for input device such as an USB interface, for example, and the input device 142 is a keyboard or a pointing device such as a mouse or a digitizer.

A communication cable in connection to the projector 11 is connected to the input I/F 141, and the coordinates of the pointed location by the pointing tool 12 are input to the projector 11. Here, to the input I/F 141, the coordinate data output by the output unit 101 of the projector 11 is input as the same data as the coordinate data output by the pointing device such as a mouse, a trackball, a digitizer, or a pen tablet. Therefore, the PC 13 may process the coordinate data input from the projector 11 as an input signal from a the input device, and may perform an operation of moving the mouse cursor and the pointer based on the coordinate data, for example.

The display unit 136 includes an image output I/F 143 having a connector for image signal output or the like, and image signal cables (not shown) in connection to a monitor 144 and the projector 11 are connected to the image output I/F 143. The image output I/F 143 has pluralities of VGA terminals that output analog video signals, DVI interfaces that output digital video signals, USB interfaces, LAN interfaces, S-video terminals that output composite video signals of NTSC, PAL, SECAM, etc., RCA terminals that output composite video signals, D-terminals that output component video signals, HDMI connectors compliant to the HDMI (registered trademark) standard, etc., for example, and the monitor 144 and the projector 11 are respectively connected to the connectors. Further, the image output I/F 143 may have a DisplayPort designed by VESA, and specifically have a DisplayPort connector or a Mini Displayport connector and an interface circuit compliant to the Displayport standard. In this case, the PC 13 may output digital video signals to the projector 11, the monitor 144, or another device via the Displayport. Note that the image output I/F 143 may transmit and receive image signals via wired communication or transmit and receive image signals via wireless communication.

In the embodiment, the case where the display unit 136 outputs an analog image signal to the projector 11 via the VGA terminal of the image output I/F 143 will be explained.

The storage unit 134 stores a display control program 13A to be executed by the CPU 131, and image data 13B to be output at execution of the display control program 13A. The CPU 131 executes the display control program 13A, and then, executes processing of transmitting the image data 13B to the projector 11. In this processing, the CPU 131 reproduces the image data 13B, and generates an analog image signal with predetermined resolution and refresh rate using the display unit 136 and outputs the signal from the image output I/F 143. Further, the storage unit 134 stores correction image data 13C output to the projector 11 it correction processing, which will be described later.

Furthermore, when the coordinates in response to the operation of the pointing device are input from the input unit 135 during the execution of the display control program 13A, the CPU 131 generates an image for displaying a pointer 12A (FIG. 1) in a location corresponding to the coordinates. Then, the CPU 131 generates image data with the pointer 12A superimposed on the image data 13B being reproduced, and outputs the image data from the output I/F 143 to the projector 11.

As described above, in the display system 10, the function of the PC 13 drawing the image data with the pointer 12A superimposed thereon to be output to the projector 11 is executed by the PC 13.

Figure 4A:
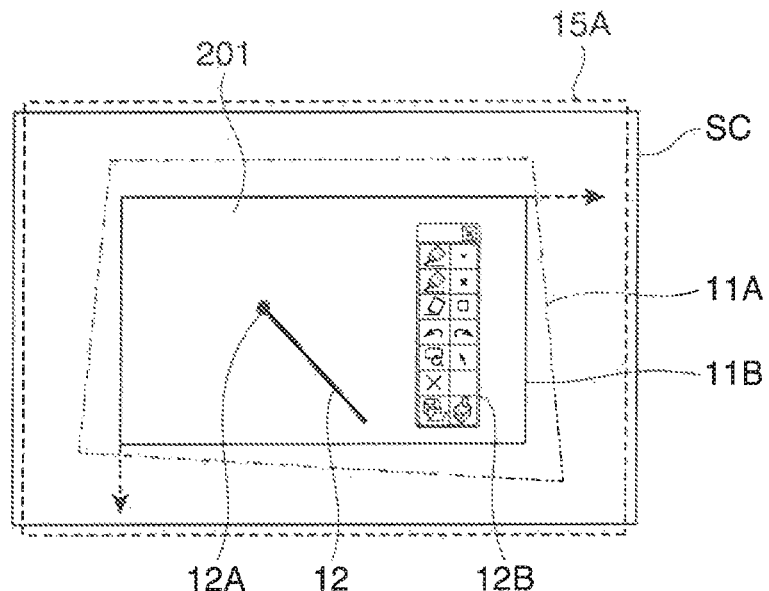
FIGS. 4A and 4B show examples of projection of images on a screen.
Figure 4B:
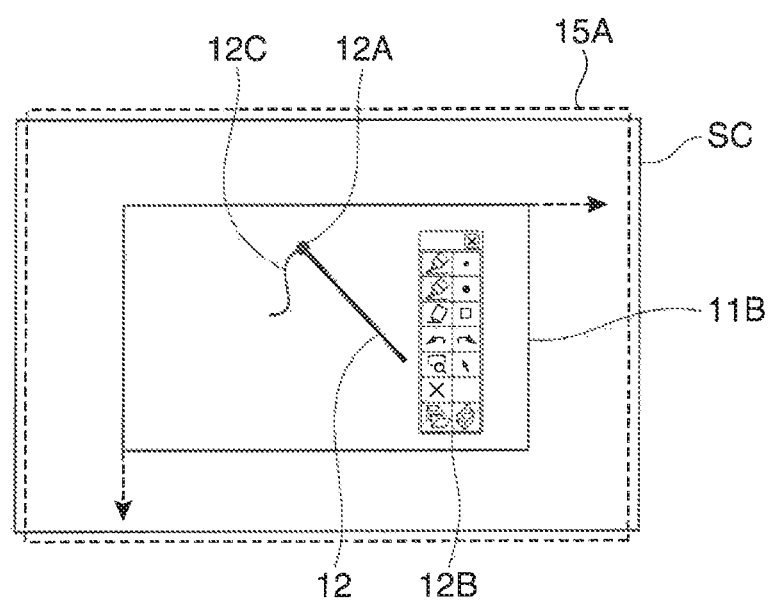

FIGS. 4A and 4B show examples of projection of images on the screen SC by the projector 11, and FIG. 4A shows a state in which the pointer 12A is projected according to the pointed location of the pointing tool 12 and FIG. 4B shows a state in which a drawn FIG. 12C is drawn according to the pointed location.

When a display image is projected using the entire modulation area of the light modulation device 32, an image is formed in the maximum projection area 11A shown by a dashed-two dotted line in FIG. 4A. Trapezoidal distortion is produced in the maximum projection area 11A as shown in FIG. 4A except the case where the projector 11 is positioned right in front of the screen SC, and the projector 11 performs keystone correction using the function of the display control part 107. After the execution of the keystone correction, a display image is projected in the effective projection area 11B as a part of the maximum projection area 11A. Typically, the effective projection area 11B is set to forma rectangular shape on the screen SC with the maximum size within the maximum projection area 11A. Specifically, the size is determined by the resolution (the resolution of the liquid crystal panel) of the modulation area of the light modulation device 32 and the degree of the trapezoidal distortion and not necessarily the maximum size. Note that, if the trapezoidal distortion is not produced in the image projected from the projector 11, it is not necessary to execute the keystone correction. In this case, the effective projection area 11B coincides with the maximum projection area 11A.

The calibration execution part 103A of the projector 11 executes calibration in the effective projection area 11B after the keystone correction. In the calibration, the calibration execution part 103A controls the image processing part 113 to draw a predetermined image for calibration. In the state in which the image for calibration is projected on the screen SC, the location detection unit 150 images the screen SC under the control of the calibration execution part 103A. FIGS. 4A and 4B show an imaging range (angle of view) 15A of the imaging part 153 by broken lines. The imaging range 15A is preferably larger than the effective projection area 11B, and more preferably larger than the maximum projection area 11A. The image for calibration is an image in which dots are arranged on a white background, for example, and stored in the memory unit 105 or the like in advance. Note that the image for calibration is not necessarily stored in the memory unit 105 or the like, but the calibration execution part 103A may generate an image for calibration at each time when execution of calibration is necessary and the calibration is executed.

The area on the screen SC to be calibrated may be the entire effective projection area 11B or a part of the effective projection area 11B. As the case where the part of the effective projection area 11B is to be calibrated, the case where, when the aspect ratio of the display image of the projector 11 and the aspect ratio of the screen SC are different (for example, the display resolution of the projector 11 WXGA and the aspect ratio of the screen SC is 4:3), display is performed so that the width in the vertical direction of the display image of the projector 11 may be equal to the width in the vertical direction of the screen SC is considered. In this case, it is conceivable that, of the effective projection area 11B of the projector 11, the area contained in the screen SC is to be calibrated and the other areas are not to be calibrated.

The calibration execution part 103A detects a contour of the display image in the taken image data, i.e., a boundary between the outside of the effective projection area 11B and the effective projection area 11B and dots in the taken image data, and specifies a correspondence relationship between a location in the imaging range 15A, i.e., location in the taken image data and a location on the effective projection area 11B. The calibration execution part 103A obtains a coordinate conversion parameter used by the coordinate calculation part 159 based on the correspondence relationship between the location on the taken image specified by the calibration and the location on the effective projection area 11B. The coordinate conversion parameter includes data associating coordinate in the area (effective projection area 11B) on the screen SC to be calibrated with coordinates obtained on the taken image data. The coordinate calculation part 159 may convert the coordinates obtained on the taken image data into the coordinates in the effective projection area 11B based on the coordinate conversion parameter. The coordinate calculation processing is performed based on the coordinate conversion parameter.

The calibration is performed by execution of a program for calibration (not shown) stored in the memory unit 105 by the control unit 103, and thus, it is not necessary to install and execute the program for calibration in the PC 13. Further, the calibration may be processing automatically performed by the calibration execution part 103A based on the taken image data or processing requiring user's operation for the image for calibration. Furthermore, the projector 11 may use the two kinds of processing in combination. As a conceivable operation for the image for calibration by the user, there is an operation of pointing a dot contained in the image for calibration by the user using the pointing tool 12 or the like.

The location detection unit 150 executes imaging in the state in which the image is projected in the effective projection area 11B, virtually sets orthogonal coordinates with their origin at a corner of the effective projection area 11B (the upper left vertex) as shown by dashed arrows in the drawings, and obtains coordinates of the tip end location (pointed location) of the pointing tool 12 in the coordinate system. The orthogonal coordinates are set based on the coordinate conversion parameter obtained by the calibration. Subsequently, when the coordinates of the tip end of the pointing tool 12 in the image data displayed in the effective projection area 11B are obtained by the coordinate conversion unit 160, the pointer 12A and a menu bar 12B shown in FIG. 4A, for example, are displayed according to the coordinates. The pointer 12A is drawn as a sign indicating the tip end location of the pointing tool 12. Further, the menu bar 12B is a GUI that can be operated by the pointing tool 12, and drawing of a figure such as a line, saving, erasing, and copying of data of the drawn figure, shifting the drawn hand-drawn image, an operation of cancelling the last operation (undo), an operation of executing the operation cancelled by undo again (redo), or the like may be performed by pointing a button located on the menu bar 12B using the pointing tool 12. As a specific example, by moving the pointing tool 12 from the location shown in FIG. 4A to the location in FIG. 4B, a drawn FIG. 12C is drawn along a trace of the tip end of the pointing tool 12. The drawn FIG. 12C is drawn by the PC 13 according to the coordinate data indicating the pointed location of the pointing tool 12 like the pointer 12A and the menu bar 12B, for example.

Figure 5A:
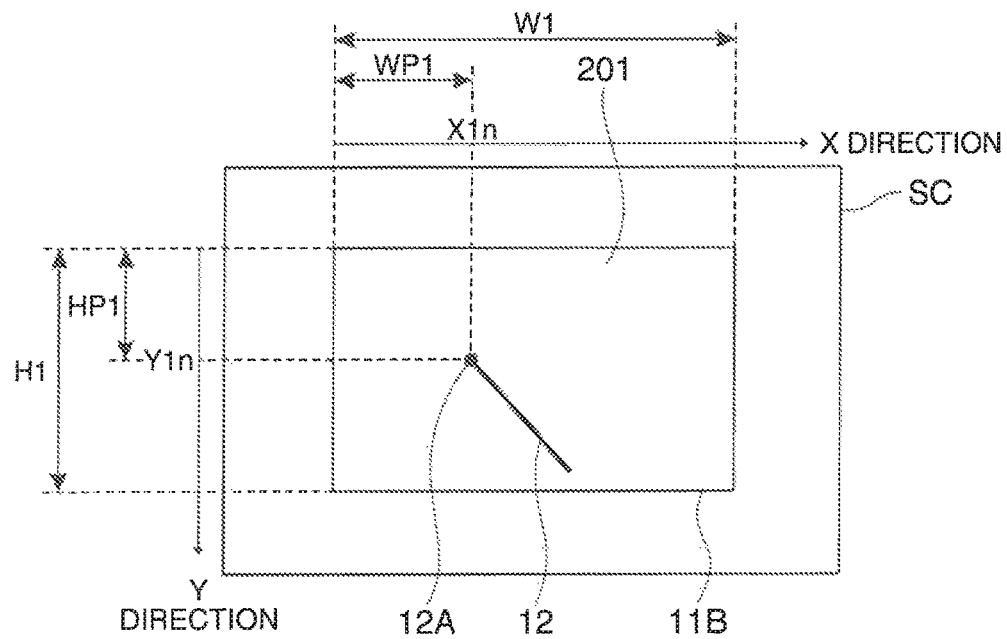
FIGS. 5A and 5B are explanatory diagrams showing processing of detecting and converting coordinates.
Figure 5B:
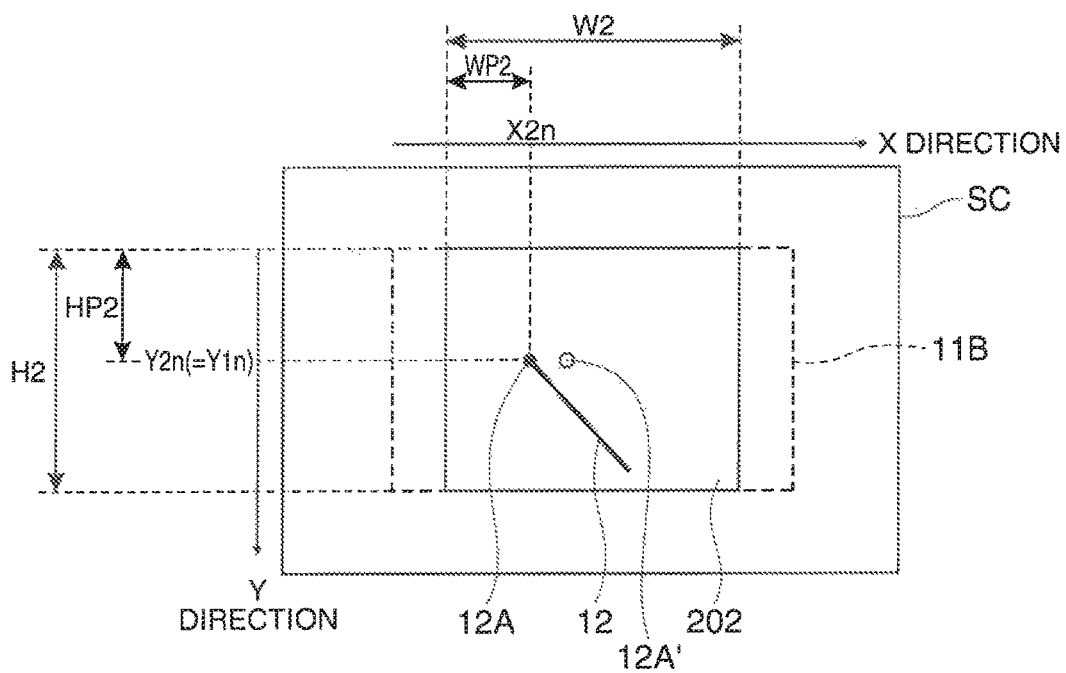

FIGS. 5A and 5B are explanatory diagrams showing processing of detecting coordinates of a pointed location and converting them into coordinates in image data by the projector 11, and FIG. 5A shows an initial state of the series of operation and FIG. 5B shows a state in which resolution of the display image has been changed from the state in FIG. 5A. Note that, in the following explanation, the case where no trapezoidal distortion is produced in the image projected by the projector 11 and the image displayed in the entire modulation area of the light modulator 32 is displayed in the effective projection area 11B will be explained. In this regard, the effective projection area 11B coincides with the maximum projection area 11A, and the resolution of the image displayed in the effective projection area 11B is equal to the resolution of the liquid crystal display panel of the light modulator 32.

The example shown in FIG. 5A is an example in which both the resolution of the liquid crystal panel of the light modulator 32 and the resolution of the image displayed in the effective projection area 11B are set to 1280×800 dots and the image signal input from the PC 13 is projected in the display mode of 1280×800 dots (WXGA), and a display image 201 of 1280×800 dots is displayed in the effective projection area 11B. The location detection unit 150 sets an X-Y orthogonal coordinate system with the origin at the upper left corner of the effective projection area 11B, the rightward direction in the X-axis direction, and the downward direction in the Y-axis direction, and sets the coordinates of the pointed location of the pointing tool 12 in the effective projection area 11B to (X1n,Y1n). The first coordinate data output by the coordinate calculation part 159 represents the coordinates (X1n,Y1n) of the pointed location.

The coordinates (X1n,Y1n) of the pointed location are coordinates normalized within the effective projection area 11B (normalized coordinates). Specifically, the coordinate X1n in the X-axis direction of the pointed location indicates a ratio of a length WP1 from the left side of the effective projection area 11B to the pointed location to a lateral width W1 of the effective projection area 11B. Further, the coordinate Y1n in the Y-axis direction of the pointed location indicates a ratio of a length HP1 from the upper side of the effective projection area 11B to the pointed location to a longitudinal width H1 of the effective projection area 11B. Here, W1, WP1, H1, and HP1 are expressed by the numbers of pixels.

In this case, the coordinates (X1n,Y1n) are calculated by the following equations (1), (2).

$$X1n = WP1 \div W1 \quad (1)$$

$$Y1n = HP1 \div H1 \quad (2)$$

For example, in the example shown in FIG. 5A, it is assumed that WP1=400 and HP1=300. The resolution of the display image 201 is 1280×800 dots, and W1=1280 and H1=800. Therefore, X1n=400÷1280≅0.313 and Y1n=300÷800=0.375. Further, in this regard, the coordinates of the upper left vertex of the effective projection area 11B, the upper right vertex of the effective projection area 11B, the lower left vertex, and the lower right vertex are expressed by (0,0), (1,0), (0,1), (1,1), respectively. Note that the effective projection area 11B coincides with the area in which the display image 201 is displayed in the state of FIG. 5A, and thus, the coordinates (X1n, Y1n) may be regarded as coordinates normalized within the display image 201.

Here, when the display mode is changed to XGA (resolution 1024×768 dots), the projector 11 scales the image data so that the resolution in the longitudinal direction (768 dots) of the image data may be increased to the resolution in the longitudinal direction (800 dots) of the liquid crystal display panel. The scaling is performed in the same manner with respect to both the longitudinal direction and the lateral direction, and the resolution in the lateral direction (1024 dots) of the image data is scaled to 1024×(800÷768)≈1066 dots. As a result, a display image 202 of 1066×800 dots is projected on the screen SC as shown in FIG. 5B. The aspect ratio and resolution of the display image 202 are different from the aspect ratio and resolution of the display it age 201 (the display image 202 is lower in resolution than the display image 201), and the area in which the display image 202 is projected does not coincide with the effective projection area 11B. In the example shown in FIG. 5B, the area in which the display image 202 is projected in the effective projection area 11B is smaller than the display image 201. Further, the projector 11 changes the location of the image so that the scaled image may be displayed at the location as close to the center as possible. Accordingly, in the effective projection area 11B, the location of the upper left vertex of the display image 201 does not coincide with the location of the upper left vertex of the display image 202.

When the resolution changes due to change of the display mode, the pointing tool 12 on the screen SC does not move and, even when the pointed location itself does not move, the relative position of the pointed location and the displayed image changes as shown in FIGS. 5A and 5B. Accordingly, the coordinates (X1n,Y1n) of the pointed location normalized with the origin on the lower left vertex of the display image 201 is different from coordinates (X2n,Y2n) of the pointed location normalized with the origin on the upper left vertex of the display image 202 are different. For example, in the coordinate system with the origin at the upper left corner of the display image 202 shown in FIG. 5B, the coordinates of the pointed location of the pointing tool 12 are (X2n,Y2n) different from (X1n,Y1n). In this case, if the pointer 12A is displayed according to the coordinates (X1n, Y1n) of the pointed location in the effective projection area 11B calculated by the location detection unit 150 based on the taken image data of the imaging part 153, the pointer 12A is shifted from the actual pointed location.

For example, in the example of FIG. 5B, the upper left vertex of the display image 202 is at the right side by 107 pixels from the upper left vertex of the display image 201 (107=(1280−1066)÷2). Therefore, given that a length from the left side of the display image 202 to the pointed location is WP2 and a length from the upper side of the display image 202 to the pointed location is HP2, WP2=WP1−107=400−107=293 and HP2=HP1=300. Further, the resolution of the display image 202 is 1066×800 dots, and a lateral width W2 and a longitudinal width H2 of the display image 202 are W2=1066 and H2=800. Therefore, the coordinates (X2n, Y2n) of the pointed location normalized with the origin on the upper left vertex of the display image 202 are expressed by X2n=(400−107)÷1066≈0.275 and Y2n=300÷800=0.375. When X1n≠X2n and the resolution of the display image changes, the normalized coordinates of the pointed location also change.

Accordingly, when the pointer is displayed on the coordinates (X1n,Y1n)=(0.313, 0.375) in the coordinate system with the origin at the upper left corner f the changed display image 202, a pointer 12A' is displayed in a location different from the coordinates (X1n,Y1n) with the origin at the upper left corner of the effective projection area 11B, i.e., a location apart from the tip end of the pointing tool 12. This is because the PC 13 draws the pointer 12A with the origin on the upper left of the image based on the normalized coordinates output from the location detection unit 150. As described above, it is impossible for the PC 13 to display the pointer 12A according to the coordinates obtained with reference to the effective projection area 11B. Accordingly, in order to support the case where the resolution of the display image changes, the projector 11 converts the coordinates (X1n,Y1n) of the pointed location calculated by the coordinate calculation part 159 of the location detection unit 150 into the coordinates (X2n,Y2n) of the pointed location in the display image being displayed, i.e., the coordinates with reference to the origin on the image being displayed.

The coordinate conversion unit 160 converts the coordinates (X1n,Y1n) into the coordinates (X2n,Y2n) based on the image location information input from the image processing part 113. The image location information is information on placement of the image in the modulation area of the light modulator 32. Further, in the embodiment, the modulation area of the light modulator 32 corresponds to the effective projection area 11B on the screen SC. Therefore, the image location information indicates the location (placement) of the display image with respect to the effective projection area 11B. In the embodiment, the image location information indicates the location (placement) and the size of the display image with respect to the effective projection area 11B. The coordinate conversion unit 160 obtains the coordinates of the pointed location in the display image based on the image location information. For example, in the examples shown in FIGS. 5A and 5B, W1, H1, W2, and H2 correspond to the image location information. Further, coordinates of the upper left end of the display image 201 (XO1,YO1)=(0,0) and coordinates of the upper left end of the display image 202 (XO2,YO2)=(107,0) also correspond to the image location information. Note that XO1, YO1, XO2, and YO2 are not normalized coordinates, but express the location of the upper left vertex of the display image by the numbers of pixels with the origin on the upper left vertex of the effective projection area 11B (or the upper left vertex of the modulation area of the light modulator 32) in the effective projection area 11B (or the modulation area of the light modulator 32). In the examples shown in FIGS. 5A and 5B, the image location information of the display image 201 is (XO1,YO1,W1,H1)=(0,0,1280,800), and the image location information of the display image 202 is (XO2,YO2, W2,H2)=(107,0,1166,800).

The coordinates (X2n,Y2n) calculated by the coordinate conversion unit 160 may be used as information for specifying the location in the image data when the PC 13 draws the pointer 12A, the menu bar 12B, or the drawn FIG. 12C in the image data to be processed. Accordingly, the pointer 12A, the menu bar 12B, or the drawn FIG. 12C may be accurately drawn according to the pointed location by the pointing tool 12 without being affected by the resolution, zoom factor, or the like of the display image.

As described above, the location and size of the display image displayed in the effective projection area 11B are affected by the resolution of the image to be displayed. For example, the resolution of the image signal input from the PC 13 changes while the image is projected based on the analog image signal input from the PC 13, the image location information changes. Here, the image location information is information on the placement of the image placement area (the area in which the display images 201, 202 are projected (displayed)) with respect to the effective projection area 11B. In other words, the image location information is information indicating the location (placement) of the display image and the resolution of the display image with respect to the effective projection area 11B (displayable area). The image location information changes when processing by which the projection state is changed is executed, and also changes when the projector 11 changes the size (resolution) and the aspect ratio of the effective projection area 11B, changes the zoom factor, changes (shifts) the display location of the image, performs multi-window display processing, or the like.

The coordinate conversion unit 160 acquires information from the image processing part 113, updates the age location information, and converts the coordinates based on the updated image location information at each time when the projection state (display state) of the display image by the projection unit 30 changes.

For example, the image location information is updated at the following times.
  when the control unit 103 detects input of an image signal from the PC 13
  when the control unit 103 detects a change in information on the image signal input from the PC 13 (resolution of an image or the like)
  when the resolution of the projected image is changed in the projector 11
  when the aspect ratio of the projected image is changed in the projector 11
  when a digital zoom function of enlarging/reducing image drawn by the light modulator 32 by image processing of image data to be projected is executed or terminated
  when the display location of a display image with respect to the effective projection area 11B is changed
  when an image is enlarged by the digital zoom function, and a function of changing the display location of the image by image processing is executed or terminated
  when a tele/wide function of enlarging/reducing the projection size of the entire including the images drawn by the light modulator 32 and the background, i.e., the entire effective projection area 11B by performing image processing of image data is executed or terminated when an image is reduced by the digital zoom function, and a picture shift function of changing the display location of the image by image processing is executed or terminated when simultaneous display of images is executed or terminated when an output destination to which coordinates are output from the coordinate conversion unit 160 is changed from the image processing unit 110 to the PC 13 (output unit 101) or vise versa All of changing of the resolution, changing of the aspect ratio, and execution and termination of the various functions are executed by the image processing unit 110 under the control of the control unit 103. Note that the listed times are just examples and, obviously, image location information can be updated at other times.

Figure 6:
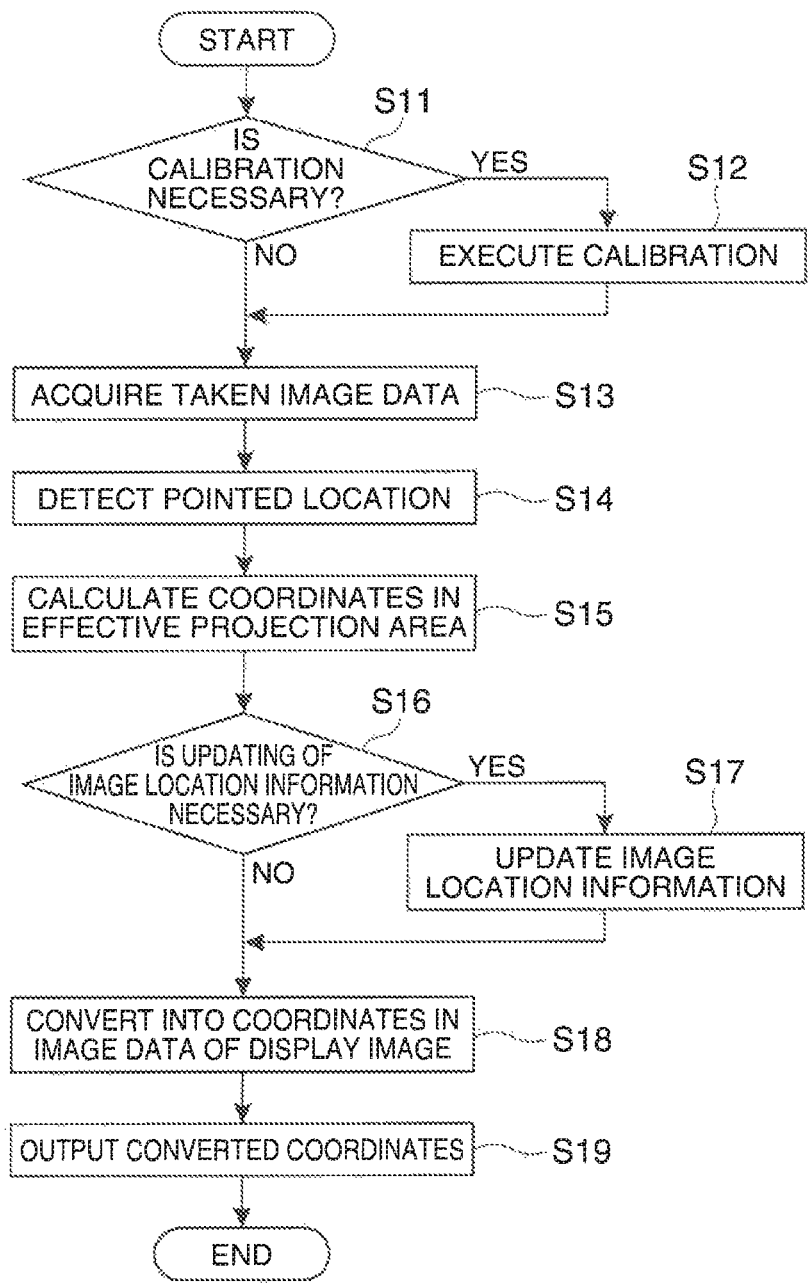
FIG. 6 is a flowchart showing an operation of the projector.

FIG. 6 is a flowchart showing an operation of the projector 11, and specifically shows an operation of detecting a pointed location by the pointing tool 12 and outputting coordinates of the pointed location.

The operation shown in FIG. 6 is repeatedly executed at regular time intervals after the projector 11 is activated or when display of the pointer 12A and the menu bar 12B is commanded by an operation of the operation panel 41 or the remote receiver unit 45.

First, whether or not calibration is necessary is determined (step S11). The determination may be performed according to the user's command indicating whether or not calibration is necessary. Or, whether or not calibration is necessary may be automatically determined by the calibration execution part 103A and the calibration may be automatically performed based on the determination result. If calibration is necessary (step S11; Yes), the calibration is executed as has been explained with reference to FIG. 4A (step S12). That is, an image for calibration is drawn by the image processing part 113, imaging is executed by the location detection unit 150 with the image for calibration projected, the contour of the effective projection area 11B in the obtained taken image data and feature points (dots or the like) contained in the image for calibration are detected, and thereby, the correspondence relationship between the image drawn by the image processing part 113 and the taken image data is obtained. Note that it is necessary to perform the calibration only once after the start of use of the projector 11, and not necessary to perform it again unless a specific event occurs. For example, in the cases of the following (1) to (3), it is necessary to perform new calibration.

(1) where keystone correction has been performed
(2) where an install condition of the projector 11 is changed, for example, where the relative position (including the direction) of the projector 11 with respect to the screen SC has been changed
(3) where an optical condition has been changed, for example, where the focus or zoom condition of the projection system 33 has been changed and where the optical axis of the projection system 33 or the imaging part 153 has been varied due to change with time or the like If these events occur, the correspondence relationship between the location on the taken image in the initial state and the location on the image drawn by the image processing part 113 as reference for calculation of coordinates by the coordinate conversion unit 160 changes (i.e., the coordinate conversion parameter changes), and it is necessary to newly perform calibration. If these events do not occur, it is not necessary to perform calibration again. If the events have not occurred after the previous use of the projector 11 before the use at this time, the coordinate conversion parameter obtained in the previous calibration may be reused without new calibration. Methods for the calibration execution part 103A to determine whether or not calibration is necessary include, for example, a method of determining it based on whether or not there is an operation of the switch for commanding execution of keystone correction in the opera panel 41, and a method of providing a sensor of detecting a tilt or motion in the projector 11 and determining it based on a change in detection value of the sensor. Or, when adjustment of focus or zoom in the projection system 33 is performed, the calibration execution part 103A may automatically execute the calibration. Or, for the user to know a change in installation location and optical condition of the projector 11 and perform the operation of commanding calibration execution, a corresponding switch may be provided on the operation panel 41 or the operation part of the remote or the like.

When the image control part 155 allows the imaging part 153 to image the range containing the effective projection area 11B under the control of the control unit 103, the location detection processing part 157 acquires the taken image data (step S13) and detects the pointed location of the pointing tool 12 based on the taken image data (step S14). Subsequently, the coordinate calculation part 159 calculates the coordinates of the pointed location detected by the location detection processing part 157 (step S15). The coordinates calculated at step S15 are coordinates in the effective projection area 11B and the coordinates (X1n,Y1n) explained in FIG. 5A.

The coordinate conversion unit 160 determines whether or not updating of the image location information is necessary (step S16) and, if updating is necessary, acquires information from the image processing part 113 and updates the image location information (step S17). The processing at step S17 may be executed not limited at the time after step S15, but at the above exemplified times as the need arises.

Then, the coordinate conversion unit 160 performs processing of converting the coordinates calculated by the coordinate calculation part 159 into coordinates in the image data of the display image (step S18). The coordinates after conversion are the coordinates (X2n,Y2n) explained in FIG. 5B.

The coordinate conversion unit 160 outputs the converted coordinates to the PC 13 (step S19), and the process is ended.

FIG. 7 schematically shows a configuration example of a resolution table of defining resolution supported by the projector 11.

In the resolution table, resolution and refresh rates of input images that the projector 11 can display are set and stored in the memory unit 105, for example. In the resolution table exemplified in FIG. 7, plural screen modes (display modes) with different resolution and refresh rates from the VGA mode with resolution of 640×480 to SXGA+ mode with resolution of 1400×1050 are set.

The display control part 107 selects one of the screen modes set in the resolution table based on the resolution and the refresh rate of the analog image signal input to the image input part 104, and performs processing for displaying the image in the selected screen mode. When selecting the screen mode with the number of pixels and resolution different from those of the liquid crystal panel of the light modulator 32, the display control part 107 allows the image processing part 113 to execute resolution conversion processing according to the parameter stored in advance in the memory unit 105 in association with the screen mode. Further, when the aspect ratios are different between the liquid crystal panel of the light modulator 32 and the selected screen mode, processing of adding a non-display area having a black strip-like shape around the image is also performed by the image processing part 113.

When the resolution of the analog image signal input to the image input part 104 does not coincide with any one of the screen modes set in the resolution table, the display control part 107 selects a screen mode close thereto. Accordingly, if the resolution of the analog image signal input from the PC 13 is not accurately detectable or is unknown resolution, a screen mode with resolution significantly different from that of the input analog signal may be selected.

Figure 8A:
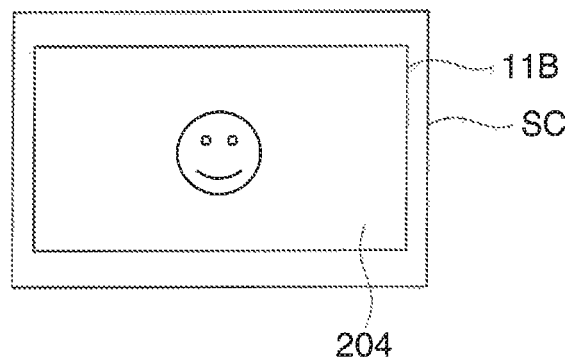
FIGS. 8A and 8B show examples of projection states on the screen.
Figure 8B:
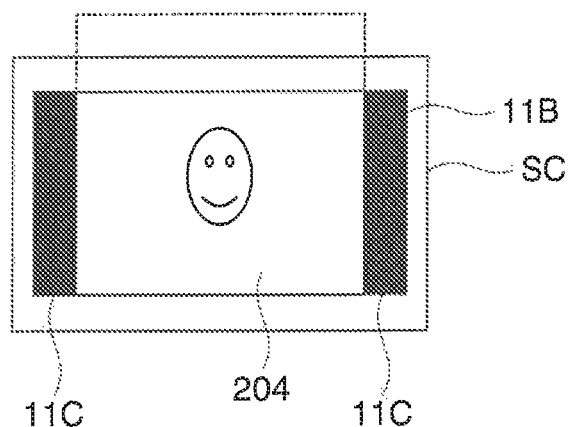

FIGS. 8A and 8B show examples of projection states on the screen SC, and FIG. 8A shows an example of projection in a proper screen mode and FIG. 8B shows an example of projection in an improper screen mode.

When a proper screen mode is selected for the analog image signal input to the image input part 104, resolution or the like of a correction image 210 is adjusted so that the image may be within the effective projection area 11B as shown in FIG. 8A, and the image is projected as an image 204.

On the other hand, when an improper screen mode is selected, adjustment of the image of unnaturally changing the aspect ratio is performed as shown in FIG. 8B, for example, and, as a result, a part of the image is out of the effective projection area 11B. This is because the difference between the resolution of the selected screen mode and the resolution of the image signal actually input to the image input part 104 is too large in the vertical direction and/or horizontal direction of the screen. Further, even when the difference between the resolution of the selected screen mode and the resolution of the image signal actually input to the image input part 104 is accidentally small, unnatural change of the aspect ratio, lying outside of the effective projection area 11B, or the like may be caused and, if a user feel uncomfortable when viewing the image on the screen SC, the projection state is not proper.

As described above, when the proper screen mode is not selected, the projector 11 recognizes the resolution different from the actual resolution as the resolution of the image signal input to the image input part 104. Therefore, the above described image location information is not accurate and the coordinate conversion unit 160 can not accurately convert the coordinates of the pointed location by the pointing tool 12.

Accordingly, the projector 11 has a function of correcting the information on the resolution in response to the operation by the user via the operation panel 41 or the remote in the case where the resolution of the image signal input from the PC 13 can not be accurately detected (recognized).

Figure 9A:
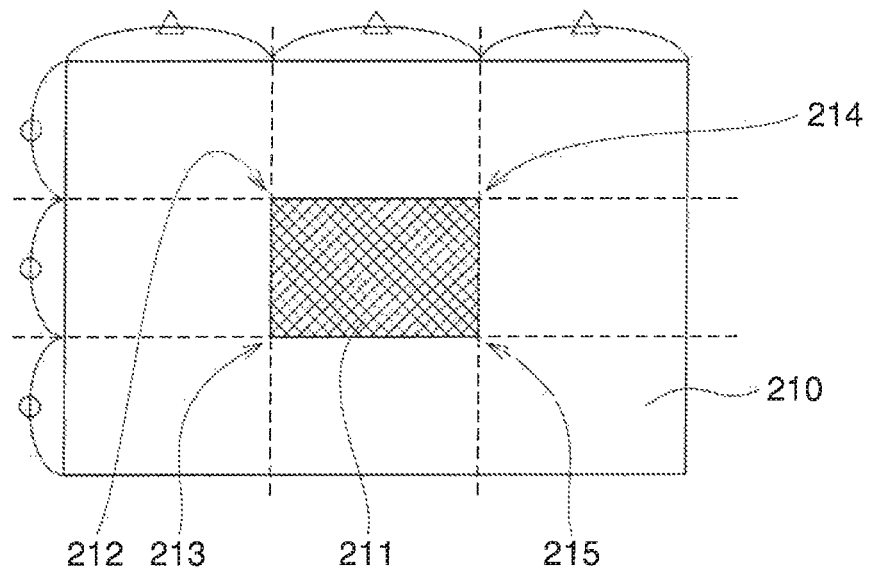
FIGS. 9A and 9B show configuration examples of a correction image.
Figure 9B:
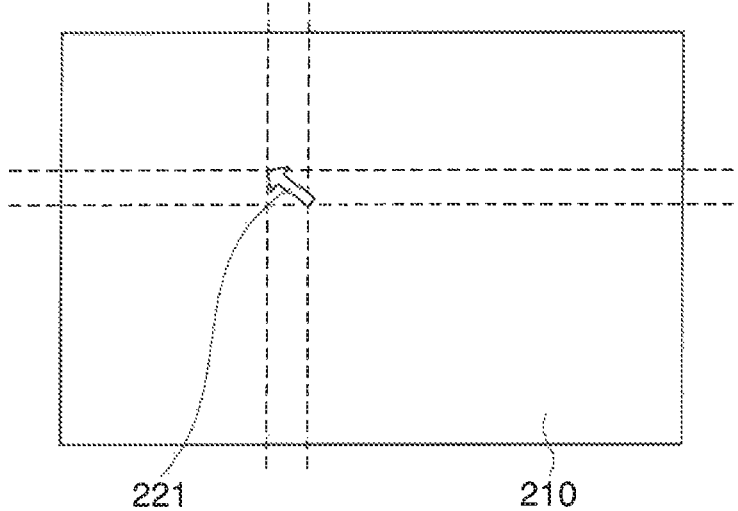

FIGS. 9A and 9B show configuration examples of the correction image 210 used for correction of information on resolution, and FIG. 9A shows an example including a rectangle as a marker and FIG. 9B shows an example using a pointer as a marker.

The correction image 210 is an image in which a rectangular marker 211 is placed on the background filled in white or another single color, and has a rectangular outline as a whole. It is desirable for the correction image 210 that the marker 211 is within the effective projection area 11B when the correction image 210 is displayed in any screen mode. For example, when the correction image 210 is displayed in the screen mode with the lowest resolution set in the resolution table (the VGA mode with resolution 640×480 in the example of FIG. 7), the marker 211 is smaller than the effective projection area 11B and the entire marker 211 is within the effective projection area 11B. More specifically, the number of pixels of the rectangle as the marker 211 and the number of pixels from the end of the correction image 210 to the outline of the marker 211 do not exceed the number of pixels of the effective projection area 11B either in the vertical direction or in the horizontal direction. It is preferable that the number of pixels of the effective projection area 11B refers to the screen mode with the minimum number of pixels in the resolution table (the VGA mode with resolution 640×480 in the example of FIG. 7).

FIG. 9A shows a typical example of the correction image 210 in which the marker 211 is placed nearly at the center of the correction image 210, and the size of the marker 211 is one-third of the entire correction image 210 both in the vertical direction and the horizontal direction and one third of the number of pixels of the correction image 210 does not exceed the number of pixels of the effective projection area 11B.

In the correction processing using the correction image 210, the location of a specific point (reference point) of the marker 211 in the correction image 210, which will be described later, is used. The most simplified and accurate method is a method using four vertexes 212, 213, 214, 215 of the marker 211 as reference points. It is necessary that at least part of the vertexes 212, 213, 214, 215 are projected within the effective projection area 11B, and the number of pixels of the correction image 210 is set as described above. Further, the locations of the vertexes 212, 213, 214, 215 in the correction image 210 are locations specified in advance. The projector 11 can use the information on the specified locations and store them in the memory unit 105. The information is information representing the locations of the vertexes 212, 213, 214, 215 using the coordinates with the origin at the corner of the correction image 210, or information including values expressing the number of pixels of the whole correction image 210 and the number of pixels from the end of the correction image 210 to the respective vertexes 212, 213, 214, 215 using the numbers of pixels themselves or ratios. Further, the information on the specified locations may be information representing the ratio of the size of the marker 211 to the size of the correction image 210.

Note that the locations of the vertexes 212, 213, 214, 215 in the correction image 210 can be changed. In this case, it is necessary for the PC 13 and the projector 11 to hold common information on the changed locations of the vertexes 212, 213, 214, 215. That is, the PC 13 changes the locations of the vertexes 212, 213, 214, 215, and generates a correction image in which the marker 211 is placed in a new location and outputs it to the projector 11 and outputs the changed locations of the vertexes 212, 213, 214, 215. The projector 11 performs processing to be described later using the changed locations of the vertexes 212, 213, 214, 215 as the locations of the reference points.

The PC 13 stores the correction image data 13C (FIG. 3) as image data of the correction image 210 in the storage unit 134. When the user commands execution of the correction processing by operation of the operation panel 41 or the remote of the projector 11, the control signal commanding the start of the correction processing is output from the projector 11 to the PC 13. When receiving the control signal commanding the start of the correction processing from the projector 11, the CPU 131 of the PC 13 reads out the correction image data 130 from the storage unit 134, generates an analog image signal for display of the correction image data 130 using the display unit 136, and outputs the signal from the image output I/F 143 to the monitor 144 and the projector 11. In this case, the display control program 13A executed by the PC 13 is a program having a function corresponding to the correction processing.

The PC 13 outputs the correction image 210 with the same resolution and the same refresh rate as those of the image signal that has been output to the projector 11 until then. Accordingly, the projector 11 executes projection of the correction image 210 without changing the screen mode.

Figure 10A:
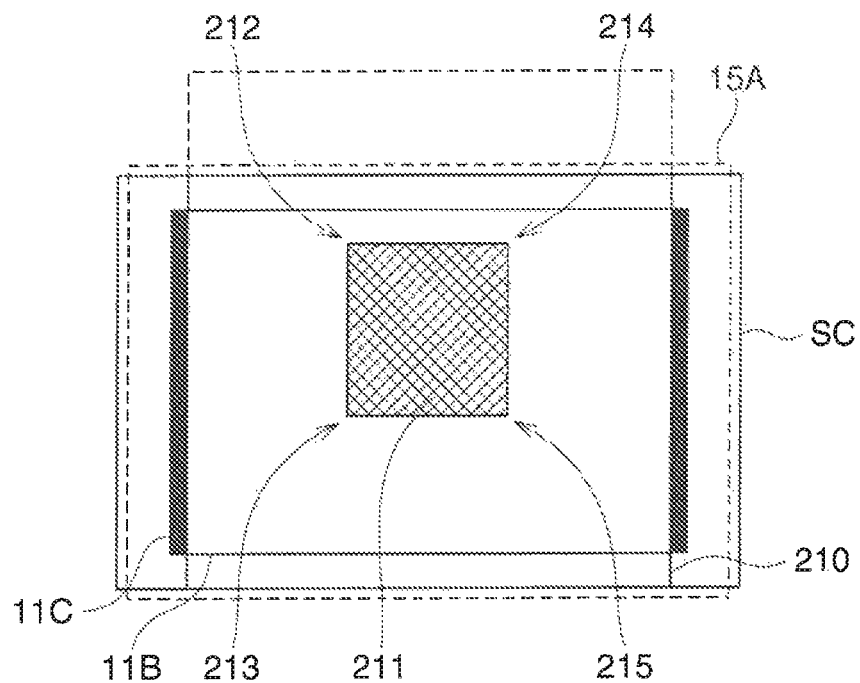
FIGS. 10A and 10B show examples of correction processing using the correction image.
Figure 10B:
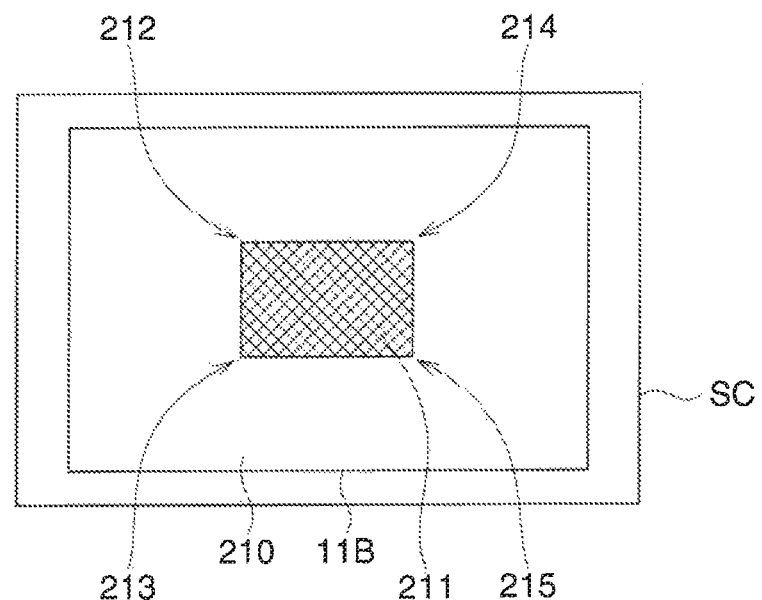

FIGS. 10A and 10B show examples of correction processing using the correction image 210, and FIG. 10A shows a state before correction and FIG. 10B shows a state after correction. Further, the imaging range 15A of the imaging part 153 is shown by broken lines in FIGS. 10A and 10B.

When the projector 11 does not accurately detect the resolution of the input image signal, the display state of the correction image 210 is distorted in aspect ratio or a part of the correction image 210 lies out of the effective projection area 11B as shown in FIG. 10A. The vertexes 212, 213, 214, 215 out of the effective projection area 11B are not imaged on the screen SC and can not be used for correction processing. Accordingly, it is necessary that at least two or more of the vertexes 212, 213, 214, 215 of the marker 211 are projected in the effective projection area 11B.

The control unit 103 controls the image control part 155 of the location detection unit 150 to perform imaging using the imaging part 153 in the state in which the correction image 210 is being displayed. When the taken image data is output from the image control part 155, the control unit 103 allows a pattern detection part 156 to perform processing of detecting the vertexes 212, 213, 214, 215 in the taken age data. The pattern detection part 156 detects the locations of the vertexes 212, 213, 214, 215 in the taken image data, and outputs the detected locations to the coordinate calculation part 159. For example, the pattern detection part 156 extracts the boundary between the monochrome background and the marker 211 based on the colors of the respective pixels of the taken image data, and detects the vertexes 212, 213, 214, 215 based on the shape of the boundary.

The correspondence relationship among the imaging range 15A, the location on the effective projection area 11B, and the location in the input is age is determined by the above described calibration, and the control unit 103 converts the locations of the vertexes 212, 213, 214, 215 detected by the pattern detection part 156 into the location in the correction image 210 as the input image based on the correspondence relationship.

The control unit 103 grasps the relative positions of the vertexes at the four corners of the correction image 210 with respect to the effective projection area 11B based on the locations of the vertexes 212, 213, 214, 215 in the converted correction image 210, the specified locations of the vertexes 212, 213, 214, 215 in the correction image 210, and the current screen mode.

For example, the control unit 103 obtains the number of pixels between the Vertexes currently being displayed based on the calculated distances between the locations of the vertexes 212, 213, 214, 215 in the correction image 210 and/or the vertexes. The control unit 103 calculates the relative position of the correction image 210 with respect to the effective projection area 11B (i.e., the location of the upper left vertex, the lateral width, and the longitudinal width of the correction image 210 in the effective projection area) based on the obtained number of pixels between vertexes and the specified location in which the vertexes 212, 213, 214, 215 are placed in the correction image 210. The parameter calculated here is accurate image location information. The calculated accurate image location information is used for the processing in FIG. 6, for example.

Furthermore, the control unit 103 may output the resolution obtained based on the correction image 210 to the display control part 107 allow the part to select the proper screen mode in response to the resolution, and update the display on the screen SC. Thereby, the correction image 210 is displayed in the proper location, size, and aspect ratio as shown in FIG. 10B. After updating of the display, the control unit 103 may execute imaging using the imaging part 153 again for confirmation of the success of the correction processing, and perform processing of obtaining the resolution of the correction image 210 based on the taken image data.

In addition, for example, when the difference between the resolution of the image signal and the screen mode set in the resolution table large and there is no corresponding screen mode, a new screen mode may be created or a message t there is no corresponding screen mode may be OSD-displayed.

Further, in the above described method, the vertexes 212, 213, 214, 215 are automatically detected by the control unit 103 based on the taken image data of the imaging part 153, however, the user may point the vertexes 212, 213, 214, 215 using the pointing tool 12. In this case, the control unit 103 may allow the location detection unit 150 to detect the pointed locations of the pointing tool 12 and execute the processing using the pointed locations as the locations of the vertexes 212, 213, 214, 215. In this case, image processing extracting the vertexes 212, 213, 214, 215 from the taken image data becomes unnecessary and the correction processing may be promptly executed.

In the above described example, the explanation that the PC 13 stores the correction image data 13C of the correction image 210 in the storage unit 134 and the correction image 210 is output to the projector 11 using the function of the display control program 13A as the special program executed by the PC has been made, however, the PC 13 may execute a general-purpose program and generate a correction image according to need.

The correction image 210 shown in FIG. 9A has a pointer 221 placed on the background. In the display system 10, as has been explained with reference to FIG. 4B, the projector 11 outputs the coordinates of the location detected using the location detection unit 150 to the PC 13, and the PC 13 displays the pointer 12A or the like in the location corresponding to the input coordinates. In this case, the PC 13 acquires the coordinates input from the projector 11 using a general-purpose device driver program for using the pointing device such as a mouse, and performs processing of displaying the pointer 12A in the location corresponding to the coordinates. In this case, it is not necessary that the display control program 13A is a special program.

In this configuration, when the projector 11 outputs coordinates of a location of one third from the top of the entire screen and one third from the left end of the screen, the PC 13 generates the correction image 210 shown in FIG. 9B and outputs it to the projector 11. In the correction image 210, the pointer 221 is placed in response to the coordinates input from the projector 11. That is, the pointer 221 that can be used as the reference point is placed in the location designated by the projector 11. As described above, unless the PC 13 executes the special program, the projector 11 may output the correction image 210 including the pointer 221 as a marker that can be used as the reference point based on the information output to the PC 13. Note that, when the PC 13 displays the pointer 221 based on the coordinates indicating the specified location input from the projector 11, the pointer 221 may be moved from the current location to the specified location. In this manner, the location of the pointer 221 may be easily visually recognized by the user.

In the method, it is difficult to change the background color of the correction image 210 by the control of the projector 11, and accordingly, the user may point the tip end location of the pointer 221 with the pointing tool 12 and the projector 11 may detect the pointed location and execute correction processing. In this case, the load of the processing of extracting the pointer 221 from the taken image data of the imaging part 153 may be reduced and, even when the background color of the correction image 210 is displayed or another image than the pointer 221 is displayed on the background, the correction processing may be promptly performed. In this case, it is preferable that the projector 11 outputs coordinates of at least two points to the PC 13 and displays the pointer 221 at the two points, and the user points the locations of the two points on the effective projection area 11B with the pointing tool 12.

The control unit 103 allows the imaging part 153 to execute imaging under the condition that the correction image 210 is projected, and extracts the pointer 221 from the taken image data. Then, the number of pixels, i.e., the resolution of the entire correction image 210 is calculated in the same manner as the above described processing based on the tip end location of the pointer 221 and the length of the pointer 221, for example. When the correction image 210 is used, the correction processing may be performed without execution of the special program by the PC 13, but only by changing the coordinates output to the PC 13 by the projector 11.

Figure 11:
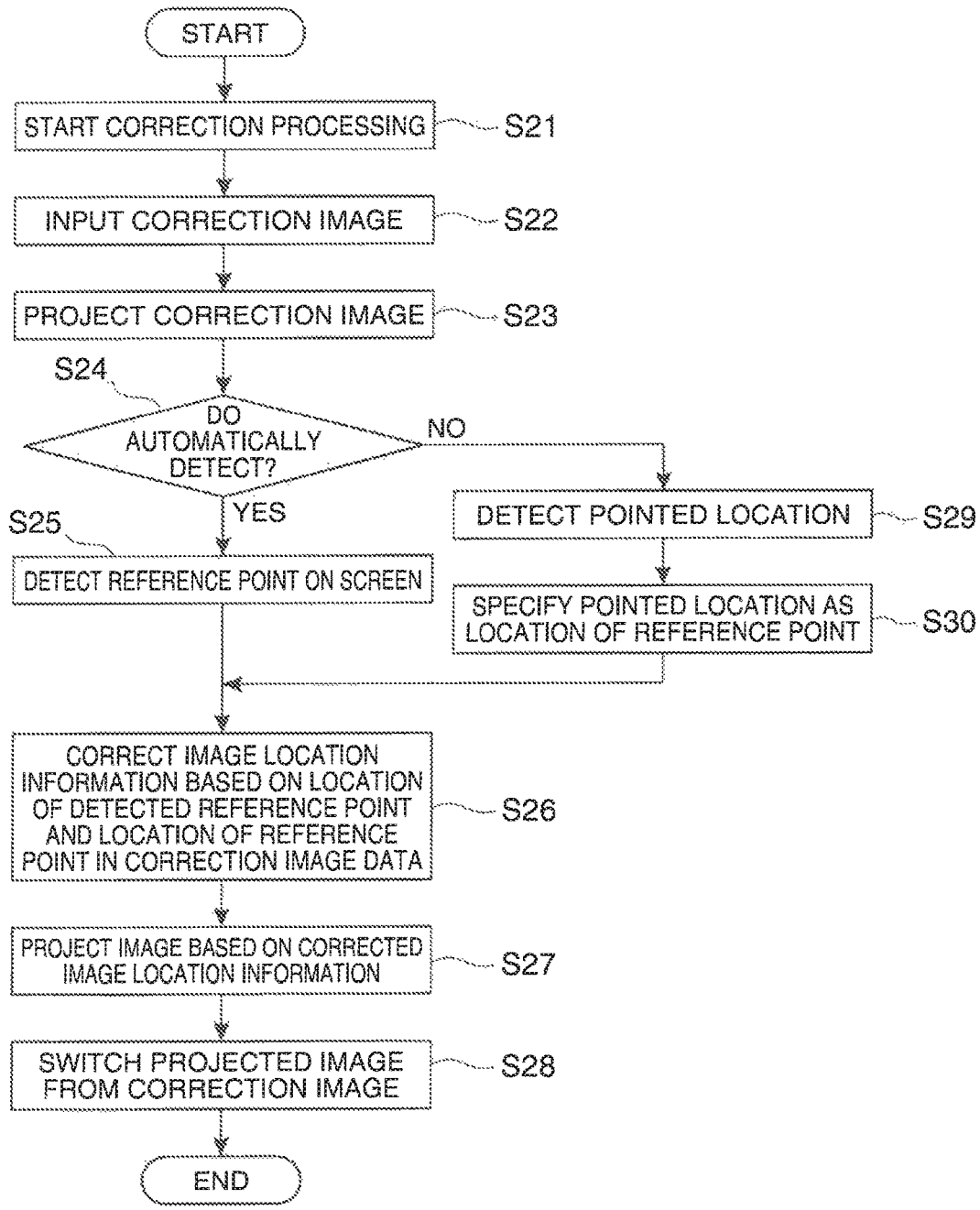
FIG. 11 is a flowchart showing an operation of the projector.

FIG. 11 is a flowchart showing an operation of the projector 11, and specifically shows correction processing. The control unit 103 executing the processing in FIG. 11 functions as a display control unit, a display location detection unit, a location correction unit, and a resolution determination unit.

The control unit 103 starts the correction processing in response to the operation of the operation panel 41 or the remote (step S21) and outputs control information or coordinates to the PC 13, and a correction image is input from the PC 13 to the projector 11 in response (step S22). The projector 11 starts projection of the correction image (step S23), and determines whether or not to automatically detect a reference point used for the correction processing (step S24).

Here, if automatic detection of the location of the reference point is set (step S24; Yes), the control unit 103 allows the imaging part 153 to image the screen SC, automatically detects the locations of the vertexes 212, 213, 214, 215 or the location of the tip end of the pointer 221 as the reference point(s) from the taken image data (step S25), calculates resolution of the correction image in the above described manner based on the detected location(s) of the reference point(s) and corrects image location information (step S26), switches to the screen mode suitable for the corrected image location information, and updates the display of the correction image (step S27). Then, the projected image is switched to the image that has been projected before switching to the correction image (step S28), and the processing is ended. Thereby, switching to the screen mode in response to the resolution of the input image is performed, and the image is projected in the accurate display location on the screen SC.

On the other hand, if the location of the reference points are manually pointed (step S24; No), the control unit 103 detects the pointed locations of the pointing tool 12 when the pointing tool 12 points the vertexes 212, 213, 214, 215 by the location detection unit 150 (step S29), specifies the locations of the detected pointed locations as the locations of the reference points S30), moves to step S26, and calculates the resolution of the correction image based on the locations of the reference points and corrects the image location information.

As described above, the display system 10 according to the embodiment to which the invention is applied includes the projection unit 3 that displays the display image on the screen SC, the location detection unit 150 that detects the pointed location with respect to the display image, the coordinate calculation part 159 that calculates the first coordinates as the coordinates of the pointed location in the displayable area within the screen SC (for example, the effective projection area 11B), the coordinate conversion unit 160 that converts the first coordinates calculated by the coordinate calculation part 159 into the second coordinates as the coordinates in the image data based on the image location information indicating the location of the display image on the screen SC, the output unit 101 that outputs the second coordinates obtained by the coordinate conversion unit 160, and the control unit 103 that corrects the information on the resolution of the supply image by the processing of displaying the correction image, and may correct the image location information used for the conversion of coordinates using the correction image. Thus, in the case where an image with unknown resolution input from the PC 13 is displayed or the like, even when accurate information on the resolution is not obtained, the system may accurately convert and output the coordinates. Thereby, regardless of the resolution of the input image, the coordinates of the location pointed by the operation on the screen SC may be accurately output.

Further, the coordinate conversion unit 160 converts the first coordinates calculated by the coordinate calculation part 159 into the second coordinates based on the image location information. For example, the coordinate conversion unit 160 performs coordinate conversion using the image location information reflecting the display resolution of the projection unit 30 and the resolution of the image data. Thereby, even when the resolution of the image data changes, the coordinates of the pointed location may be correctly converted and output.

Further, for example, the correction image displayed by the projection unit 3 includes the monochrome background and the marker 211 placed in a location having a high possibility to be displayed within the effective projection area 11B, and the correction processing may be promptly executed by detecting the marker 211 located in the effective projection area 11B.

The projector 11 can project the correction image 210 input from the PC 13 on the screen SC, and automatically detect the marker 211 and the pointer 221 based on the taken image data obtained by imaging of the screen SC.

Furthermore, in the correction processing, the reference point can be detected by the location pointing operation by the user. That is, the control unit 103 may correct the information on the resolution based on the pointed location detected by the location detection unit 150 and the location of the pointer 221 in the correction image 210 under the condition that the projection unit 3 displays the correction image 211 on the screen SC.

In addition, the display system 10 according to the embodiment to which the invention is applied includes the projection unit 3 that displays the image supplied from the PC 13 as the image source on the display surface, allows the projection unit 3 to display the correction image using the control unit 103, detects the display location in which the correction image is displayed based on the reference point of the correction image, for example, and corrects the display location of the image displayed by the projection unit 3 based on the detected display location, and thereby, even when the display location of the image is shifted for the reason that the resolution of the image supplied from the PC 13 can not be accurately acquired or the like, may correct the display location and display the image in the proper location.

Further, the control unit 103 has a function of selecting the screen mode in response to the resolution of the image supplied from the PC 13 and allowing the projection unit 3 to display the image according to the selected screen mode, selects the proper screen mode by determining the resolution of the correction image and correcting the image location information, and thus, even when the display location is shifted because the resolution may not accurately detected, the image may be displayed in the accurate location.

Furthermore, the projector 11 includes the location detection unit 150 that detects the pointed location pointed by the operation of the pointing tool 12 on the screen SC, and the control unit 103 detects the reference point of the correction image based on the pointed location detected by the location detection unit 150 under the condition that the correction image is displayed, and thus, the display location may be accurately detected based on the operation on the screen SC and the processing related to the correction of the display location may be accurately performed.

Note that the above described embodiment is just an example of the specific embodiment to which the invention is applied, but does not limit the invention, and the invention may be applied as an embodiment different from the above described embodiment. For example, in the embodiment, the configuration in which the control unit 103 corrects the image location information by detecting the location of the reference point from the correction image, selects the screen mode based on the corrected image location information and updates the display, and converts and outputs the coordinates of the pointed location of the pointing tool 12 based on the corrected image location information has been explained, however, the invention is not limited to that. For example, the control unit 103 may obtain the resolution of the correction image by detecting the location of the reference point, and then, only update the display by changing the screen mode based on the resolution, but may not update the image location information or convert the coordinates based on the updated image location information. That is, under the condition that the correction image is displayed, only execution of proper display may be performed by resolving the shift of the display location and the unsuitable display resolution. Also, in this case, when the resolution of the image supplied from the image source is unknown, an advantage that the display location may be promptly corrected may be obtained.

Further, for example, in the embodiment, the configuration in which the PC 13 stores the correction image data 13C and the PC 13 outputs the correction image 210 to the projector 11 has been explained, however, the data for the projector 11 to display the correction image may be stored in the memory unit 105, and the control unit 103 may read out the data from the memory unit 105 according to the start of the operation shown in FIG. 11, allow the image processing unit 110 to execute processing, and allow the projection unit 3 to display the image. Alternatively, the projector 11 may store the data necessary for generation of the correction image (data of the background, data of the marker and the pointer, etc.) in the memory unit 105, the control unit 103 may generate the correction image according to the start of the operation shown in FIG. 11 and allows the projection unit 3 to display the correction image.

Furthermore, in the embodiment, the configuration in which the correction image actually projected on the screen SC is imaged by the imaging part 153 and the location of the reference point is detected from the taken image data has been explained, however, the invention is not limited to that. The marker as the reference point may be detected from the image data developed in the frame memory 115 (memory) by the image processing part 113 (image development unit) based on the image signal of the correction image input from the PC 13 and correct the image location information. In this case, the location of the marker may be promptly and accurately specified without being affected by the projection state on the screen SC and the condition of imaging by the imaging part 153.

In addition, in the configurations of the embodiments, the imaging part 153 and the image control part 155 of the location detection unit 150 may be replaced by an imaging device (a digital camera or the like) externally connected to the projector 11. The imaging device in this case may execute imaging under the control of the control unit 130 and output taken image data to the location detection processing part 157. A general-purpose interface such as a USB may be used as the interface connecting the imaging device and the projector 11, and the digital camera may be easily realized. Further, the location detection unit 150 may be externally connected to the projector 11. In this case, the location detection unit 150 may be a device independent from the projector 11.

Furthermore, in the configurations of the embodiments, the image source is not limited to the PC 13, but various portable or stationary devices that can connect via the image input part 104 and output images may be used, and further, the projector 11 may project the images stored in the memory unit 105 as the image source.

In addition, in the configurations of the embodiments, the pointing tool 12 is not limited to one having the rod shape or the pen shape, but, for example, a finger of the user may be used as the pointing tool 12 and its pointed location may be detected.

Further, in the configurations of the embodiments, the configuration in which the location detection unit 150 detects the pointed location by the pointing tool 12 based on the taken image data has been explained as an example, however, the invention is not limited to that. For example, pressure-sensitive or capacitance touch panel may be provided on the screen SC as the display surface or a display screen in other display systems, and the touch panel may detect contact of the user's finger, a rod-like member, or the like as the pointing tool 12.

Moreover, the pointing tool 12 may include an operation tool such as a button and transmit an operation signal from the pointing tool 12 to the projector 11 when the operation tool is pressed. Further, when the operation tool is operated, the pointing tool 12 may output light having a predetermined wavelength (non-visible light or visible light) in response to the operation and stop the output of the light when the operation is terminated. In this case, whether or not the operation of the pointing tool 12 is being performed may be determined by determining whether or not light is output from the pointing tool 12 based on the taken image data imaged by the imaging part 153. Therefore, not only the pointed location of the pointing tool 12 but also whether or not the operation has been performed on the operation tool (whether or not the operation tool has been pressed) may be detected by the location detection processing part 157.

Furthermore, in the example, the configuration in which light having the predetermined wavelength is output when the operation tool is operated and the output of the light is stopped when the operation is terminated has been explained as an example, however, the invention is not limited to that. For example, the pointing tool 12 may constantly output light having a predetermined wavelength in a predetermined pattern and change the emission pattern to a different pattern and emits light when the operation is performed on the operation tool. In this case, the pointing tool 12 constantly emits light in the predetermined pattern, and thereby, the location detection processing part 157 may constantly detect the pointed location of the pointing tool 12. Further, the location detection processing part 157 may detect whether or not the operation has been performed on the operation tool based on the emission pattern.

Further, information representing that the operation tool has been operated and information representing that the operation on the operation tool has been terminated may be output from the projector to the PC as control data. For example, the projector may output the information representing that the operation tool has been operated as information representing that the mouse has been left-clicked to the PC and output the information representing that the operation on the operation tool has been terminated as information representing that the left click of the mouse has been terminated to the PC. Furthermore, the projector 11 may output operation information as information representing operation of another pointing device (e.g., a digitizer or the like) than the mouse to the PC 13.

In addition, in the embodiments, the configuration in which the control unit 103 functions as the calibration execution part 103A has been explained as an example, however, the invention is not limited to that. For example, the location detection unit 150 may have part or all of the functions of the calibration execution part 103A. Specifically, when the location detection unit 150 is an imaging device externally connected to the projector 11 and the imaging device functions as the calibration execution part 103A, it is unnecessary that the projector 11 has a configuration corresponding to the calibration execution part 103A.

Further, the device externally connected to the projector 11 may function as the location detection unit 150, the calibration execution part 103A, and the coordinate conversion unit 160. Furthermore, the device externally connected to the projector 11 may function as the location detection unit 150 and the coordinate conversion unit 160.

In addition, in the embodiments, the explanation that the size of the marker 211 placed in the correction image 210 is one third of the entire correction image 210 both in the vertical direction and the horizontal direction has been made, however, the size of the marker 211 is not limited to that. At least one of the vertical size and the horizontal size of the marker 211 may be larger or smaller than one third of the size of the entire correction image 210.

Further, in the embodiments, the example using the four vertexes of the marker 211 placed in the correction image 210 as the reference points has been explained, however, the method of using the marker 211 is not limited to that. For example, two vertexes on the same diagonal line of the four vertexes of the marker 211 may be used as the reference points.

Furthermore, in the embodiments, the example in which the projector 11 determines whether or not to automatically detect the reference point has been explained, however, the method of detecting the reference point is not limited to that. The projector 11 may constantly automatically or constantly manually detect the reference point.

In addition, in the embodiments, the coordinates (X1n, Y1n) and the coordinates (X2n,Y2n) have been normalized in the range from "0" to "1", however, the normalizing method is not limited to that. For normalization of the coordinates, a logically defined arbitrary value (for example, a range from "0" to "32767" or the like) may be used.

Furthermore, in the embodiments, the configuration in which the PC 13 and the projector 11 are wired-connected by a cable or the like has been explained as an example, however, the connection form between the projector 11 and the PC 13 is arbitrary. For example, the projector 11 and the PC 13 may be connected to each other via wireless communication using a wireless LAN, Bluetooth (registered trademark), or the like or wired communication using a general-purpose data communication cable such as an USB, a wired LAN, or the like, and may transmit and receive coordinate data.

In addition, in the embodiments, the configuration in which the light modulator 32 uses the three transmissive or reflective liquid crystal panels corresponding to the respective colors of RGB as a unit that modulates the light generated by the light source has been explained, however, the invention is not limited to that. For example, a system combining one liquid crystal panel and a color wheel, a system using three digital mirror devices (DMDs), a DMD system combining one digital mirror device and a color wheel, or the like may be employed. Here, in the case where only one liquid crystal panel or DMD is used as the display unit, the member corresponding to the combining system such as the cross dichroic prism is unnecessary. Other devices than the liquid crystal panel or the DMD may be employed without difficulty as long as they may modulate the light generated by the light source.

Further, the display device of the embodiment of the invention is not limited to the projector that projects images on the screen. The image display device of the embodiment of the invention includes various display devices such as self-emitting display devices of a liquid crystal monitor or a liquid crystal television that displays images on a liquid crystal panel, a monitor device or a television receiver that displays images on a PDP (plasma display panel), or a monitor device or a television receiver that displays images on an organic EL panel called OLED (Organic Light-emitting diode), OEL (Organic Electra-Luminescence), or the like. In this case, the liquid crystal display panel, the plasma display panel, the organic EL display panel correspond to a display unit, and its display screen corresponds to the display surface. More specifically, the entire area in which images can be displayed corresponds to the effective projection area 11B or the maximum projection area 11A of the embodiments.

Furthermore, the respective functional parts of the projector 11 shown in FIG. 2 and the respective functional parts of the PC 13 shown in FIG. 3 show functional configurations realized by cooperation of hardware and software, and the specific mounting form is not particularly limited. Therefore, it may be not necessarily that hardware individually dealing with the respective functional parts is mounted, and obviously, one processor may execute programs and realize the functions of the plural functional parts. Or, part of the functions realized by software in the embodiments may be realized by hardware or part of the functions realized by hardware in the embodiments may be realized by software. In addition, specific detailed configurations of the other respective parts of the display system 10 including the projector 11 and the PC 13 may be arbitrarily changed without departing from the scope of the invention.

Further, the control program 105A that has been stored in the memory unit 105 in the embodiments may be downloaded from another device connected to the projector 11 via a communication network, or the control program 105A may be recorded in a portable recording medium and the respective programs may be read out from the recording medium and executed. Similarly, regarding the display control program 13A stored in the PC 13, the PC 13 may download the display control program 13A from another device and execute it or the PC 13 may read out the display control program 13A recorded in a portable recording medium and execute it.

What is claimed is:

1. A display device comprising:
   a display unit configured to display a supply image supplied from an image source on a display surface;
   a location detection unit configured to detect a pointed location on the display surface;
   a coordinate calculation unit configured to calculate first coordinates as coordinates of the pointed location in a displayable area on the display surface, the displayable area being an area where the supply image can be displayed;
   a coordinate conversion unit configured to convert the first coordinates calculated by the coordinate calculation unit into second coordinates as coordinates in the supply image based on image location information indicating a location of the supply image on the displayable area;
   an output unit configured to output the second coordinates obtained by the coordinate conversion unit; and
   a location correction unit configured to:
      cause the output unit to output third coordinates specified in advance to the image source in response to a predetermined operation by a user,
      cause the location detection unit to detect the pointed location when a tip end location of a pointer tool operated by a user points to a reference pointer, the reference pointer being provided by the image source and displayed at a location corresponding to the third coordinates specified in advance in the supply image by the image source, and
      correct the image location information based on the pointed location corresponding to the third coordinates detected by the location detection unit.

2. The display device according to claim 1, wherein the location correction unit is further configured to:
   cause the output unit to output fourth coordinates specified in advance to the image source following the third coordinates,
   cause the location detection unit to detect the pointed location when the user points to the reference pointer displayed at a location corresponding to the fourth coordinates in the supply image by the image source, and
   correct the image location information based on the pointed locations corresponding to the third coordinates and the fourth coordinates detected by the location detection unit.

3. The display device according to claim 1, wherein the coordinate conversion unit is further configured to convert the first coordinates calculated by the coordinate calculation unit into the second coordinates based on resolution of the supply image and the image location information.

4. The display device according to claim 1, wherein the display unit is a projector including:
   a light modulation unit configured to modulate light emitted from a light source;
   an image formation unit configured to form the display image on the light modulation unit based on the supply image; and
   a projection unit configured to project the display image formed by the image formation unit on a projection surface as the display surface.

5. A display control method comprising:
   displaying a supply image supplied by an image source on a display surface;
   detecting a pointed location on the display surface;
   calculating first coordinates as coordinates of the pointed location in a displayable area on the display surface, the displayable area being an area where the supply image can be displayed;
   converting the calculated first coordinates into second coordinates as coordinates in the supply image based on image location information indicating a location of the supply image on the displayable area;
   outputting the second coordinates obtained by the conversion to the image source;
   outputting third coordinates specified in advance to the image source in response to a predetermined operation by a user;
   detecting the pointed location when a tip end location of a pointer tool operated by a user points to a reference pointer, the reference pointer being provided by the image source and displayed at the location corresponding to the third coordinates specified in advance in the supply image by the image source; and
   correcting the image location information based on the pointed location corresponding to the third coordinates.

* * * * *